US012430733B2

United States Patent
Catbas et al.

(10) Patent No.: US 12,430,733 B2
(45) Date of Patent: Sep. 30, 2025

(54) COMPUTER VISION-BASED SYSTEM AND METHOD FOR ASSESSMENT OF LOAD DISTRIBUTION, LOAD RATING, AND VIBRATION SERVICEABILITY OF STRUCTURES

(71) Applicant: University of Central Florida Research Foundation, Inc., Orlando, FL (US)

(72) Inventors: Fikret Necati Catbas, Oviedo, FL (US); Chuanzhi Dong, Orlando, FL (US)

(73) Assignee: University of Central Florida Research Foundation, Orlando, FL (US)

( * ) Notice: Subject to any disclaimer, the term of this patent is extended or adjusted under 35 U.S.C. 154(b) by 611 days.

(21) Appl. No.: 17/712,038

(22) Filed: Apr. 1, 2022

(65) Prior Publication Data
US 2022/0383478 A1    Dec. 1, 2022

Related U.S. Application Data

(60) Provisional application No. 63/195,590, filed on Jun. 1, 2021.

(51) Int. Cl.
*G06T 7/00* (2017.01)
*G06T 7/73* (2017.01)
(Continued)

(52) U.S. Cl.
CPC .............. *G06T 7/0002* (2013.01); *G06T 7/74* (2017.01); *G06V 10/225* (2022.01);
(Continued)

(58) Field of Classification Search
CPC . G06T 2207/10016; G06T 2207/20076; G06T 2207/20084; G06T 2207/20104;
(Continued)

(56) References Cited

U.S. PATENT DOCUMENTS

| | | | | |
|---|---|---|---|---|
| 8,483,977 B1 * | 7/2013 | Johnnie | ................ | G01N 29/12 |
| | | | | 702/36 |
| 11,486,697 B1 * | 11/2022 | Tyson | ................... | G01N 21/33 |

(Continued)

FOREIGN PATENT DOCUMENTS

| | | | |
|---|---|---|---|
| CN | 102044127 A | * | 5/2011 |
| CN | 109345148 A | * | 2/2019 |

(Continued)

OTHER PUBLICATIONS

C. Z. Dong, "Investigation of vibration serviceability of a footbridge using computer vision-based methods", Engineering Structures 224 (2020) 111224 Aug. 29, 2020.

(Continued)

*Primary Examiner* — Brandon J Miller
(74) *Attorney, Agent, or Firm* — Tiajoloff & Kelly LLP

(57) ABSTRACT

A computer vision-based system provides for load distribution estimation and load rating and vibration serviceability assessment of structures. The system integrates evaluates the structural load carrying capacity, the diagnosis and prognosis of performance and safety, and vibration serviceability. Cameras record images of a structure, and regions of interest are monitored in those images for their displacement and velocity as loading varies. Where the displacement determined exceeds a predetermined threshold, or where the acceleration determined exceeds predetermined limits, or where the distribution of displacements of parts of the (Continued)

structure deviates substantially from an estimated displacement distribution, an output indicating potential problems with the structure is output.

20 Claims, 13 Drawing Sheets

(51) Int. Cl.
    *G06V 10/22*     (2022.01)
    *G06V 20/54*     (2022.01)
    *H04N 23/90*     (2023.01)

(52) U.S. Cl.
    CPC .... *G06T 2207/30184* (2013.01); *G06V 20/54* (2022.01); *H04N 23/90* (2023.01)

(58) Field of Classification Search
    CPC ......... G06T 2207/30184; G06T 7/0002; G06T 7/246; G06T 7/74; G06T 7/80; G06V 10/225; G06V 20/176; G06V 20/54; H04N 23/90
    See application file for complete search history.

(56) References Cited

U.S. PATENT DOCUMENTS

| | | | | |
|---|---|---|---|---|
| 12,033,315 | B1* | 7/2024 | Wu | G06V 10/751 |
| 2016/0171309 | A1* | 6/2016 | Hay | A61B 5/01 |
| | | | | 348/143 |
| 2016/0349040 | A1 | 12/2016 | Min et al. | |
| 2017/0221216 | A1 | 8/2017 | Chen et al. | |
| 2018/0084195 | A1 | 3/2018 | Yang et al. | |
| 2019/0035086 | A2 | 1/2019 | Buyukozturk et al. | |
| 2020/0110041 | A1* | 4/2020 | Ziehl | G10L 25/51 |

FOREIGN PATENT DOCUMENTS

| | | | | |
|---|---|---|---|---|
| CN | 109870223 | A | * 6/2019 | |
| CN | 209148032 | U | * 7/2019 | |
| CN | 111044197 | A | * 4/2020 | ............... G01L 5/04 |
| CN | 111649816 | A | * 9/2020 | ............... G01H 1/00 |
| CN | 109341903 | B | * 10/2020 | ............ G01L 1/103 |
| CN | 214333886 | U | * 10/2021 | |
| WO | WO-2011016857 | A2 | * 2/2011 | ........... B62D 57/024 |

OTHER PUBLICATIONS

C. Z. Dong, "A review of computer vision-based structural health monitoring at local and global levels", Structural Health Monitoring 2021, vol. 20(2) 692-743, Jul. 20, 2020.

C. Z. Dong, "A portable monitoring approach using cameras and computer vision for bridge load rating in smart cities", J Civil Struct Health Monit 10, 1001-1021 (2020). https://doi.org/10.1007/s13349-020-00431-2, Aug. 29, 2020.

Chen et al., "Vehicle load identification of long-span bridges based on dynamic image recognition: Theoretical research and application in Sutong Bridge", 4th International Symposium on Life-Cycle Civil Engineering. Tokyo, Japan, 2014, DOI: 10.1201/b17618-148, Life-Cycle of Structural Systems, ISBN 978-1-138-00120-6, Oct. 21, 2014.

J.G. Chen et al., "Camera-Based Vibration Measurement of the World War I Memorial Bridge in Portsmouth, New Hampshire", Journal of Structural Engineering, vol. 144, issue 11, 04018207, Nov. 2018.

J.G. Chen et al., "Modal identification of simple structures with high-speed video using motion magnification", Journal of Sound and Vibration, vol. 345: 58-71, Mar. 2, 2015.

C.Z. Dong et al., "A robust vision-based method for displacement measurement under adverse environmental factors using Spatio-Temporal context learning and Taylor approximation", Sensors 2019; vol. 19, 3197, Jul. 20, 2019.

Dong, "Investigation of Computer Vision Concepts and Methods for Structural Health Monitoring and Identification Applications" Electronic Theses and Dissertations, 6867, https://stars.library.ucf.edu/etd/6867 (Release date: Jun. 2020).

Feng et al., "Vision-based multipoint displacement measurement for structural health monitoring", Structural Control and Health Monitoring; vol. 23, 876-890, Nov. 5, 2015.

Ilg et al., "FlowNet 2.0: evolution of optical flow estimation with deep networks", Proceedings of the IEEE Conference on Computer Vision and Pattern Recognition 2017, 2462-2470, Jul. 21, 2017.

S.-W. Kim et al., "Vision-based monitoring system for evaluating cable tensile forces on a cable-stayed bridge", Structural Health Monitoring, vol. 12: 440-456, Dec. 20, 2013.

G. Li et al., "Determination of the dynamic load factors for crowd jumping using motion capture technique", Engineering Structures, vol. 174: 1-9, Jul. 20, 2018.

D.G. Lowe, "Distinctive image features from scale-invariant keypoints", International Journal of Computer Vision, vol. 60: 91-110, Jan. 22, 2004.

Y. Pan et al., "A novel computer vision-based monitoring methodology for vehicle-induced aerodynamic load on noise barrier", Structural Control and Health Monitoring 2018, vol. 25: 1-19, Aug. 26, 2018.

L. Tian et al., "Remote bridge deflection measurement using an advanced video deflectometer and actively illuminated LED targets", Sensors 2016, vol. 16: 1-13, Aug. 23, 2016.

Y. Xu et al., "A non-contact vision-based system for multipoint displacement monitoring in a cable-stayed footbridge", Structural Control and Health Monitoring 2018, vol. 25: 1-23, Jan. 16, 2018.

K. Zhang et al., "Fast Tracking via Spatio-Temporal Context Learning", arXiv Prepr., arXiv1311.1939 2013, 1-16, Nov. 8, 2013.

Z. Zhang, "A Flexible New Technique for Camera Calibration (Technical Report)", IEEE Transactions on Pattern Analysis and Machine Intelligence, vol. 22: 1330-1334, Nov. 2000.

J. Zhao et al., "Video-based multiscale identification approach for tower vibration of a cable-stayed bridge model under earthquake ground motions", Structural Control and Health Monitoring 2019, vol. 26: 1-19, Dec. 11, 2018.

Zheng et al., "Measuring human-induced vibrations of civil engineering structures via vision-based motion tracking", Measurement, vol. 83: 44-56, Jan. 27, 2016.

D. Feng et al., "A vision-based sensor for noncontact structural displacement measurement", Sensors 2015, vol. 15: 16557-575, doi.org/10.3390/s150716557, Jul. 9, 2015.

Y. Xu, et al., "A non-contact vision-based system for multipoint displacement monitoring in a cable-stayed footbridge", Structural Control and Health Monitoring 2018, vol. 25: 1-23, doi.org/10.1002/stc.2155, Jan. 16, 2018.

H. Yoon et al., "Target-free approach for vision-based structural system identification using consumer-grade cameras", Structural Control and Health Monitoring 2016, vol. 23: 1405-1416, doi.org/10.1002/stc.1850, Feb. 11, 2016.

\* cited by examiner

CV-based displacement measurement

COMPUTER VISION-BASED SYSTEM AND METHOD FOR ASSESSMENT OF LOAD DISTRIBUTION, LOAD RATING, AND VIBRATION SERVICEABILITY OF STRUCTURES

RELATED APPLICATIONS

This application claims priority of U.S. provisional application Ser. No. 63/195,590 filed Jun. 1, 2021, which is herein incorporated in its entirety by reference.

U.S. GOVERNMENT FUNDING

This invention was made with Government support under Grant number CMMI-1463493 awarded by the National Science Foundation. The Government has certain rights in this invention.

FIELD OF THE INVENTION

This invention relates to systems and methods of automatic monitoring of structures using a camera in communication with a computer system, and especially to computer-vision-based monitoring of structures such as bridges or buildings, particularly where the system generates a notification of the healthy or unhealthy condition of the structure.

BACKGROUND

Structures and infrastructures, in the U.S. and worldwide, have deteriorated and lost some carrying capacity over their life cycles. On one hand, the material deterioration, structural change and capacity loss not only induce service interruption, but also potentially pose safety risk for structures.

To guarantee the normal operation of the structure, a great deal of investment, including capital cost, time and labor forces have to be put into the asset management, maintenance, repair, retrofit and replacement. According to the 2017 ASCE Infrastructure Report Card, the grade point average (GPA) of America's civil infrastructures is D+ on an A through F grading scale and the cost for the improvement is around 4.59 trillion USD. Consequently, it may become an overburden on the shoulders of the States and Federal infrastructure owners and managing departments.

On the other hand, the structures that have been identified as "defected" may still be safe, given their conservative designs. A great deal of money can be saved by retaining the infrastructures in service and monitoring them to ensure their remaining life. In fact, there is an overall need for improving infrastructures as discussed by the National Academy of Engineering as one of the Grand Challenges of Engineering in the 21st century. These challenges created an urgent need of efficient and effective monitoring and inspection approaches for structural condition assessment and further improvement of civil infrastructures.

In current engineering practice, visual inspection is the primary approach for the inspection and condition assessment of structures and infrastructures. The asset owners and management departments put large amounts of effort and resources into the visual inspection tasks, guidelines, and personnel. A qualified inspector needs to go through the inspector qualification, training and certification. However, the accuracies of visual inspection highly rely on the inspectors' subjective judgments, and, during the inspection, it might be necessary to close the structure to traffic to ensure the safety of the inspectors and make the inspection procedure normal.

Structural health monitoring (SHM) plays a critical role in detecting the structural deteriorations and changes quantitatively to support for better management, maintenance and improvement of structures. And a dedicated SHM system can achieve long-term monitoring of structures and provide detailed monitoring data for deep analysis. SHM technologies can carry out the diagnosis and prognosis of performance and safety of civil infrastructures more objectively than visual inspection. However, limitations such as (1) the difficulty of external load distribution estimation, (2) complexity in field implementation of a monitoring system due to installation, wiring and maintenance of sensors and data acquisition system and (3) the high cost of equipment and technologies in current structural monitoring may create challenges. As a result, the development of effective, convenient, and inexpensive monitoring tools for the improvement of civil infrastructures is becoming more important.

In recent years, with the development of imaging devices having low cost and high quality, and with the remarkable progress of computer vision (CV) techniques, computer vision-based SHM (CV-SHM) has been gathering increasing attention in the SHM community. In addition, the corresponding techniques can be implemented into SHM to derive effective structural condition information and provide benefit to the conventional practice of SHM. The research studies for CV-SHM at the global level mainly focus on two aspects of monitoring: (1) CV-based structural response (output) monitoring, and (2) CV-based load (input) estimation. In the two research focuses, the larger portion is CV-based structural response (output) monitoring and only a part is related to CV-based load (input) estimation.

The research and applications of CV-based structural response (output) monitoring usually initiate from the displacement measurement of structures using computer vision technologies such as visual tracking to track the motion of the measured structures, then the obtained displacements were utilized to conduct the analysis of structural behaviors, dynamic properties, modal analysis, cable force etc. For example, Tian and Pan, "Remote bridge deflection measurement using an advanced video deflectometer and actively illuminated LED targets", Sensors (Switzerland) 2016, 16: 1-13, describes measuring the deflection profile of a multispan railway bridge by using zero-mean normalized sum of square difference (ZNSSD)-based multi-point tracking during load test. Xu et al., "A non-contact vision-based system for multipoint displacement monitoring in a cable-stayed footbridge", Structural Control and Health Monitoring, 2018; 25: 1-23, describes monitoring the dynamic displacements of a cable-stayed footbridge under human crowds using zero-mean cross-correlation based-template matching methods and analyzing the instantaneous frequency and amplitude change when a large human crowd crossed the bridge. Zhao et al., "Video-based multiscale identification approach for tower vibration of a cable-stayed bridge model under earthquake ground motions", Structural Control and Health Monitoring, 2019; 26: 1-19, describes combining the support correlation filter algorithm and Lucas-Kanade optical flow to estimate the vibration responses of the tower of the scaled model of a cable-stayed bridge under earthquake loads. Chen et al., "Modal identification of simple structures with high-speed video using motion magnification", J. Sound Vib. 2015; 345: 58-71 and Chen et al., "Camera-Based Vibration Measurement of the World War I Memorial Bridge in Portsmouth, New Hampshire" J. Struct. Eng.

2018; 144: 04018207 describe implementing phase-based optical flow, Fourier transform and motion magnification to extract the instantaneous mode shape of a beam in a lab and a truss bridge. Feng et al., "Vision-based multipoint displacement measurement for structural health monitoring", Structural Control and Health Monitoring, 2016; 23: 876-890, described obtaining the modal parameters from a CV-based displacement measurement and then using those modal parameters to update a finite element model (FEM). Kim et al. "Vision-based monitoring system for evaluating cable tensile forces on a cable-stayed bridge", Structural Health Monitoring, 2013; 12: 440-456, described implementing ZNCC based-template matching to monitor the vibrations of multiple cables of a cable-stayed bridge and estimating the tension forces based on the vibration frequencies. Current research and applications of CV-based structural response (output) monitoring are to develop CV-based methods, verify them on laboratory structures and then apply them on real-life structures. CV-based structural response (output) monitoring rarely relates to the needs and requirements of specific structures.

The research and applications of CV-based load (input) estimation generally target on the human loads and vehicle loads imposed on structures by using the computer vision technologies such as object detection and visual tracking to detect and localize the visible loads. Currently, the research and applications of CV-based load (input) estimation are quite limited, and they are not combined with the CV-based structural response (output) monitoring to conduct structural health/safety/condition monitoring and assessment.

SUMMARY OF THE INVENTION

It is accordingly an object of the invention to provide a system and a method of monitoring a structure using computer vision that avoids the shortfalls of the prior art.

According to an aspect of the invention, a computer-vision-based method for determining load worthiness or serviceability of a structure comprises directing one or more cameras at the structure so as to derive image data defining a series of images of a target portion of the structure. The image data is received at a computer system that performs a computer vision process on the image data so as to derive location data from the image data. The location data corresponds to locations of the target portion in each of the images. A safety assessment is determined for the structure from the location data, and a report of the safety assessment is output.

According to another aspect of the invention, a computer system with one or more cameras is provided that is configured to perform a safety assessment of a structure applying a procedure along the lines of the above method.

According to another aspect of the invention, a computer-vision-based system for determining load worthiness or serviceability of a structure comprises a plurality of cameras each directed at a respective target portion of the structure that moves as the structure experiences loads. A computer system has computer accessible data storage associated with it, and the cameras each communicate with the computer system so as to transmit to the computer system image data corresponding to a respective series of images taken spaced at equal time intervals of the respective target portion, the images each being a field of pixels. The computer system has stored computer-vision software running on which the computer system processes the image data and identifies based on it a pixel location of each of the target portions in each of the images. The computer system performs a comparison, for each of the target portions, of the pixel location of the target portion in a first of the images with the pixel locations of the target portion in the images later in the series of images and it derives from the comparison one or more displacement data values as a number of pixels in the associated image. The computer has data indicative of an estimated displacement distribution of the target portions of the structure subject to its loading during the period of taking of the images of the target portions. An additional camera is supported so as to capture serial images of loads moving on the structure and transmits the images to the computer system. The computer system receives the images from the additional camera and uses a computer-vision process to derive from them location of a load or loads on the structure. The data indicative of an estimated displacement distribution is modified or selected based on the location or locations of any load or load derived. The computer system generates assessment data for the structure based on a comparison of the displacement data for the target portions with the estimated displacement distribution. The assessment data indicates a problem with the structure where any of the displacement data indicates a target portion has deviated from the estimated displacement distribution. The computer system transmits the assessment data to an output device with which the computer system communicates so as to display the assessment data to a user.

The system integrates different types of algorithms for various types of structures, and addresses limitations of the prior art in cases of adverse environmental factors. The system broadens the applications of further structural health monitoring and condition assessment, and provides for effective vibration serviceability assessment, load distribution estimation, and load rating.

According to an aspect of the invention, a comprehensive system uses the input and output information extracted from cameras and computer vision for load distribution estimation and load rating and vibration serviceability assessment of structures. It better supports research study and engineering practices of SHM and structural identification, and supports the asset owners and managing departments for better decision making of condition assessment, maintenance, repair and retrofit.

Some portions or aspects of the system and methods described herein are discussed in the following publications, which all are incorporated herein by reference:

Dong, C. Z., Bas, S., and Catbas, F. N. (2020), "Investigation of vibration serviceability of a footbridge using computer vision-based methods", Engineering Structures, 224, 111224 (Available online Aug. 29, 2020);

Dong, C. Z., Bas, S., and Catbas, F. N. (2020), "A portable monitoring approach using cameras and computer vision for bridge load rating in smart cities", Journal of Civil Structural Health Monitoring, DOI: 10.1007/s13349-020-00431-2 (Published Aug. 29, 2020);

Dong, C. Z., and Catbas, F. N. (2020), "A review of computer vision-based structural health monitoring at local and global level", Structural Health Monitoring, 1-52, DOI: 10.1177/1475921720935585 (Published Jul. 20, 2020).

DETAILED DESCRIPTION

Figure 1:
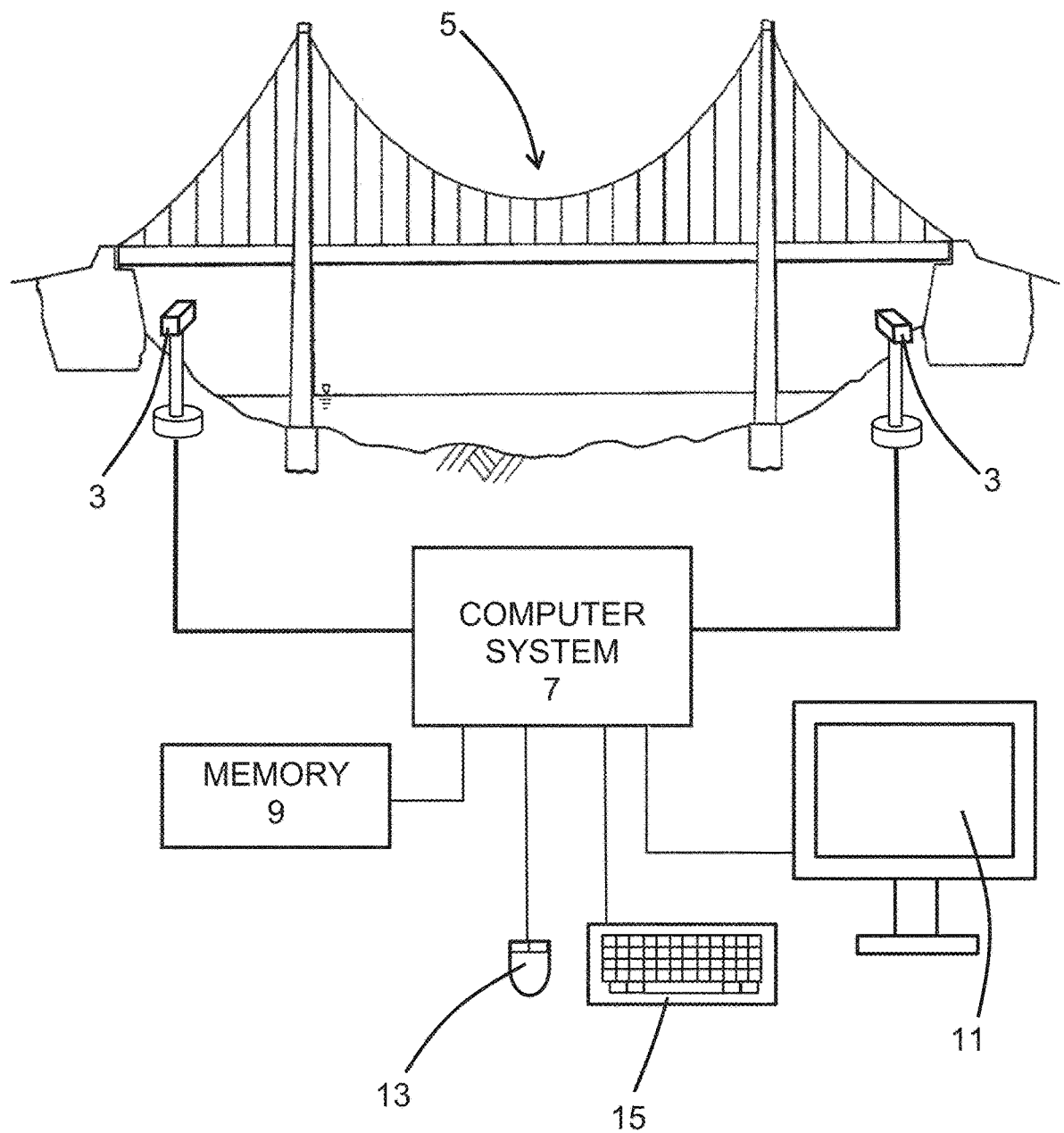
FIG. 1 is a diagram generally showing a system according to the invention.

Referring to FIG. 1, the system has one or more cameras 3, which are preferably high-definition digital cameras that transmit electrical signals corresponding to a series of frames of video, each frame of which is a two-dimensional pixel array, wherein each element of the pixel array is stored color data that defines a color or monochrome shade of the respective pixel photographed by the camera 3. The camera or cameras 3 are directed at a structure 5, for example a bridge, or a stadium or other building to be monitored, or at a portion or portions of the structure. The applicability of the system includes, but is not limited to, structures such as different types of bridges, buildings, towers, dams, pipelines, railways, wind turbines, airplanes, cables, etc.

The images are transmitted to a computer system 7 so that it receives electronic signals corresponding to imagery from the cameras 3. The computer system 7 is a computer, as well known in the art, and it has one or more processors, computer memory or data storage devices 9 accessible to the processor(s) storing data defining software in the memory. The software causes the computer to receive the digital images from the cameras 3, and to determine from those images data corresponding to a condition assessment of the structure based on movement of the portions of the structure that is derived from the images. The computer also preferably has a display 11 that displays imagery derived from the condition assessment data to a user on a display device, and a printer (not shown) may also be connected with the computer, or other communications devices or connections that provide for giving the user the output indicating the healthy or unhealthy condition of the structure. Various other input devices, such as a mouse 13 or a keyboard 15, are also preferably connected with the computer so as to provide a user with a capability of inputting instructions or commands to the computer 7.

It will be understood that the cameras, computer, and the display devices may be all co-located and connected locally at the structure, or the computer and display may be located remotely and connected by the Internet or some other communications system, wired or wireless. In addition, the entire system, i.e., one or more cameras 3 and the computer 7 itself, may be portable for easy movement to different structures.

The system of the invention estimates the load distribution, load rating and vibration serviceability of the structure 5 using the imagery from which displacement data is derived using computer vision that corresponds to the structural response measurement. Generally, the structural responses referred to here are displacement and velocity.

First, the computer 7 is initially set up by a series of steps, and then the computer 7 continually and repeatedly performs a series of steps of an assessment process that derives assessment data for the condition of the structure from the imagery from the cameras.

The first step of the assessment process is to determine displacement data from the image data, i.e., the imagery from one or more of the cameras 3, which includes videos or image sequences of the structure, by using computer vision. Then, key performance indicators and metrics for the estimation of the load distribution, load rating and vibration serviceability of structures are developed and calculated. Finally, based on the structural performance, the condition, including the load distribution, load rating, and vibration serviceability, is assessed. The data derived is then output or displayed to the user in a report form for the structure 5 on the display or a printer.

The operation of the system to derive a structural displacement measurement using computer vision is discussed below, as is the processing of the computer-vision-based data to derive and output the load distribution, load rating and vibration serviceability assessment of the structure or structures.

Structural Displacement Measurement Using Computer Vision

Figure 2:
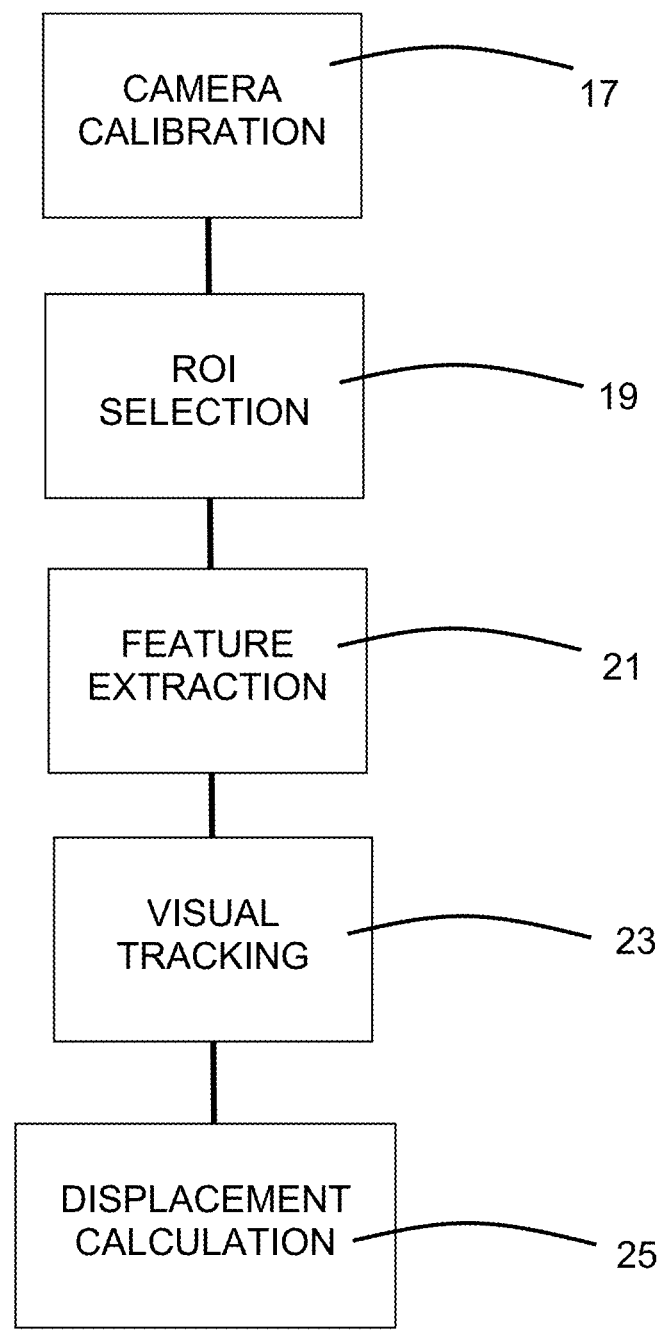
FIG. 2 is a diagram illustrating the method of CV-based displacement measurement of the invention.

FIG. 2 is a diagram of the procedure of the structural response measurement using computer vision in which the computer system 7 converts the motion of the measurement target, i.e., the relevant portion or portions of the structure being inspected, in the camera images to derive data defining the amount and rate of motion of that measurement target in the real world.

There are generally five steps to extract structural response data information, including displacement and velocity, from image data that comprises digital image sequences, usually videos as are well known in the camera arts, where the sequence of images is 30 or more per second, with substantially equal time intervals between the photographic taking of each of the images, i.e., frames, of the video. These steps are generally performed automatically by the computer system after the camera or cameras are set up and calibrated.

Initially, the projective geometry relationship between the camera and real world is determined in camera calibration step 17. This calibration step provides data to the computer that corresponds to how many physical units in the real world represent the size of each pixel in an image from each of the cameras 3, or rather the distance in the real world between the portion of structure viewed in each pixel and the portion of structure viewed in another of the pixels after the portion of the structure moves.

Where there is an angle between the camera and the structure, due to the parallax perspective effect, different pixels may represent different distances in the real world. The camera calibration is therefore very critical to accurately convert the displacement in pixel units to physical units, such as millimeters.

The calibration data is derived from measurement data that is normally entered by a human user using physically measured dimensions taken from the structure of the system. It will be understood that the computer may derive calibration data for the pixels from a limited number of actual measurements by calculating the intermediate distances between the actual measurement points and associating those calculations with intermediate pixels. The result of the calibration step 17 is that the computer system stores calibration data for each pixel identifying the location to which the camera is directed scaled in real-world units so that it can determine relative real-world displacement between the pixels of each camera 3. In other words, the computer stores data that allows it to determine the physical distance in the real world from what is seen in a selected pixel in one image to what is seen in another pixel in another image from the same camera.

Next, in step 19, the regions of interest (ROI) are selected. An ROI represents one of two types of region. One region is the target for measurement in the image, also called the target ROI. The other region is the sub-region of the image in which the target moves during the measurement, and it is also called the searching region or searching ROI. The target ROI includes manual markers, patterns, or targets installed on the surface of the structure 5, or the parts of the structure with distinct surface features, e.g., textures. Typically, the ROI selection is done by a human user interacting with the computer system and identifying the ROIs in images from the cameras.

In step 21, features are extracted from the selected target ROIs for visual tracking. Feature extraction is well-known in the art of computer vision, and this step may be done by the computer using the images from the camera or cameras. In structures being inspected, the feature may be any visually differentiable portion of the structure, such as a girder, a bolt, or some other part of the structure, or a scannable pattern label attached to the structure, that computer-vision can see and locate in the video image frames so as to derive movement or displacement data in real time for that part of the structure.

In step 23, the computer performs a visual tracking, which employs an algorithm selected according to the measurement requirement and convenience. The visual tracking is implemented so as to track the motion of the selected target ROI in the searching ROI.

In step 25, the displacement of the selected searching ROI is calculated by the computer system based on the visual tracking results and camera calibration information.

Each of these steps is described in greater detail below.

Camera Calibration

For projective transform, the process of converting data from images to data reflecting the real world, it is necessary to determine the relationship between the images from the camera and the real world. Real-world measurements are input to the computer system by a human user during placement of the system that define distances to one or more portions of the structure in the field of view of each camera. A projective geometry calculation is performed based on those measurements, and camera calibration is performed in which the computer reverses the camera projection.

Figure 3:
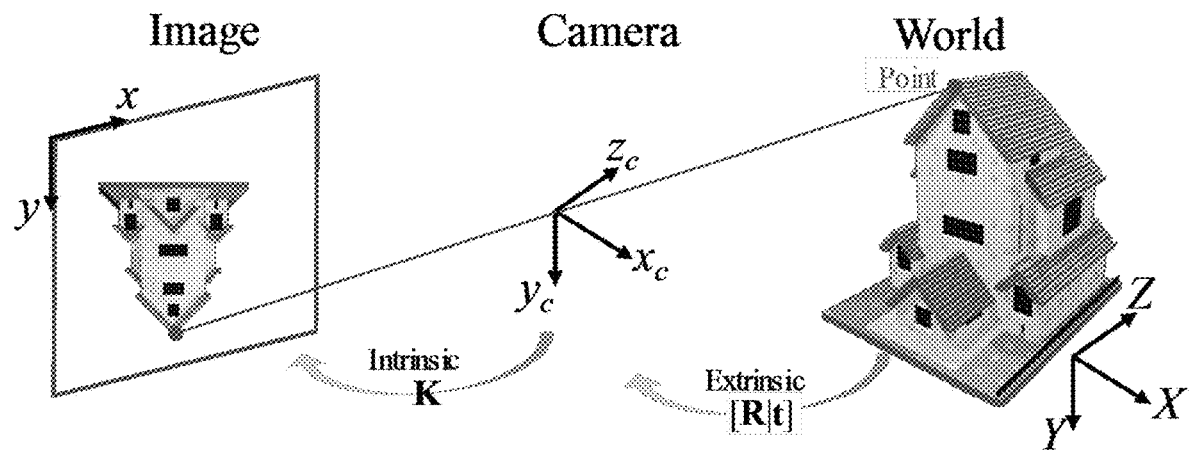
FIG. 3 is a diagram illustrating projection from a real-world object to a camera image.

FIG. 3 is a diagram of pinhole camera model, which shows the projective transform from three-dimensional (3D) world to two-dimensional (2D) image. Data defining extrinsic and intrinsic matrices are estimated during the camera calibration, and those matrices are used by the computer to calculate the projection transform from real-world coordinates to the image coordinates through camera coordinates, which is a determination according to the formula below:

$$sx = K[R|t]X \qquad (1)$$

This formula can be expanded as:

$$s\begin{pmatrix} x \\ y \\ 1 \end{pmatrix} = \begin{bmatrix} f_x & \gamma & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{pmatrix} X \\ Y \\ Z \\ 1 \end{pmatrix} \qquad (2)$$

where s is the scale factor, $x=(x, y, 1)^T$ are image coordinates, $X=(X, Y, Z, 1)^T$, are world coordinates.

K is a matrix of the camera intrinsic parameters, which represents the projective transformation from the 3D world to the 2D image plane, as indicated in FIG. 3, illustrating that K is a transformation matrix from coordinates $x_c$, $y_c$, $z_c$ of camera to the x,y coordinates of the image as received in the computer.

R and t are camera extrinsic parameters that represent the rigid rotation and translation from the 3D real world coordinates to the 3D camera coordinates. This is illustrated in FIG. 3 as the transformation matrix R|t converting the real word X,Y,Z points to the relative 3D points in the camera position coordinate system $x_c$, $y_c$, $z_c$.

In the intrinsic matrix K, $f_x$, and $f_y$ are the focal lengths of the lens in horizontal and vertical directions, $c_x$ and $c_y$ are offsets of the optical axis in horizontal and vertical directions, and y is the skew factor of the lens.

In the extrinsic matrix (R|t), $r_{ij}$(i, j=1, 2, 3) and $t_i$(i=1, 2, 3) are the elements of R and t, respectively. Eqs. (1) and (2), indicate that the camera intrinsic parameters are relevant to the camera and lens, and the camera extrinsic parameters are relevant to the relative position between the camera-lens and real objects, i.e., camera pose.

The computer system is calibrated by providing it with data defining the intrinsic and extrinsic matrices, or with data from which the computer may derive that matrix data, which the computer stores and uses continually. Once the camera is calibrated with a specific lens, so long as the focal lens does not change, the data defining the intrinsic parameters stored by the computer does not change. However, the stored data defining the extrinsic parameters should be recalculated and calibrated in different application scenarios, because the pose of the camera changes and that alters the spatial relationship of the camera to the structure being photographed.

The article of Z. Zhang, "A Flexible New Technique for Camera Calibration (Technical Report)" IEEE Transactions on Pattern Analysis and Machine Intelligence 22: 1330-1334 (2002), describes a practical calibration approach that is commonly used and may be used here. That procedure utilizes images of a black and white chessboard taken in different camera poses. Once all the parameters in Eq. (2) are obtained, the computer calculates, using the formula of Eq. (2), conversions of the displacement in pixel units to that in physical units. Specifically, Eq. 2 defines the relationship between the image space to the real world. The calibration procedure yields data for s, K, R|t, of Eq. 1, and the computer then calculates an inverse matrix of K[R|t]. When analyzing the image data, the computer applies a similar transformation calculation to that of Eq. 2 and calculates the real world coordinates (X, Y, Z) from the camera image coordinates (x,y) by multiplying the (x. y. 1) vector by the inverse matrix of K[R|t] and adjusting the scale to that of the real world.

Figure 4:
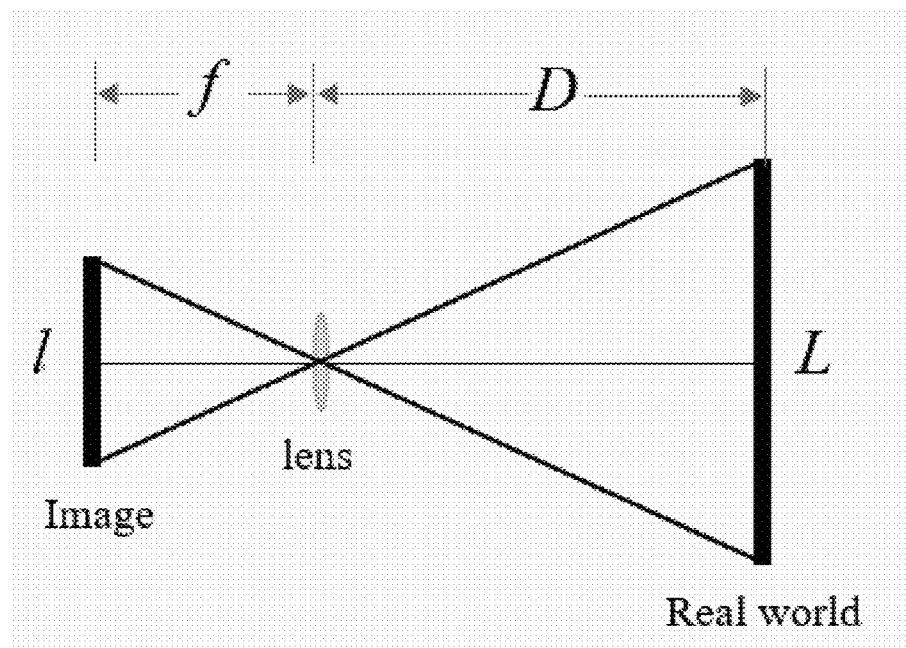
FIG. 4 is a diagram illustrating calibration of an image to the real-world object using a scale ratio.

Scale ratio. In some CV-SHM applications, the projective transform may be simplified by use of a scale ratio and homography transform. The scale ratio, SR, can be expressed as:

$$SR = \frac{L}{l} = \frac{D}{f} \quad (3)$$

where L is the length of the object in real world, l is the length with the unit of the associated pixels in the associated image, D is the distance from the camera to the object, and f is the focal length, as shown in FIG. 4.

Compared to the projective transformation in Eqs. (1) and (2), the scale ratio is much simpler and easier to calculate, and, in most practical applications, the scale ratio is used. When the axis of the camera-lens is perpendicular to the measurement plane, as is the case in the diagram in FIG. 4, the scale ratio can be calculated from Eq. (3).

This calculation works most accurately for situations where the plane of concern is normal to the line of sight to the camera. For the cases in which there is an inclination of the plane relative to the line of sight, or to the plane of the image taken by the camera, a method as set out in Dong et al., "Marker free monitoring of the grandstand structures and modal identification using computer vision methods", Structural Health Monitoring 18:1491-1509 (2019), incorporated herein by reference, may be employed.

However, if the axis of camera-lens is not perpendicular to the motion plane, the preferred embodiment makes use of a homography transform.

The computer uses a homography matrix if the motion/change of the structure is limited in one plane. The projection from the real world plane to the image plane is expressed by the homography transform:

$$X = sHx \quad (4)$$

Eq. (4) is a degraded version of the formula of Eq. (1). Eq. (4) can be formed by:

$$\begin{Bmatrix} X \\ Y \\ 1 \end{Bmatrix} = \begin{bmatrix} h_1 & h_2 & h_3 \\ h_4 & h_5 & h_6 \\ h_7 & h_8 & h_9 \end{bmatrix} \begin{Bmatrix} x \\ y \\ 1 \end{Bmatrix} \quad (5)$$

where X is degraded to $(X, Y, 1)^T$. In this formulation, H is the 3×3 homography matrix and $h_i$ (i=1, 2, . . . , 9) is the element of H. The homography matrix H has 9 unknowns and only 8 of them are independent. Here, at least four point correspondences are needed to calculate H.

Figure 5:
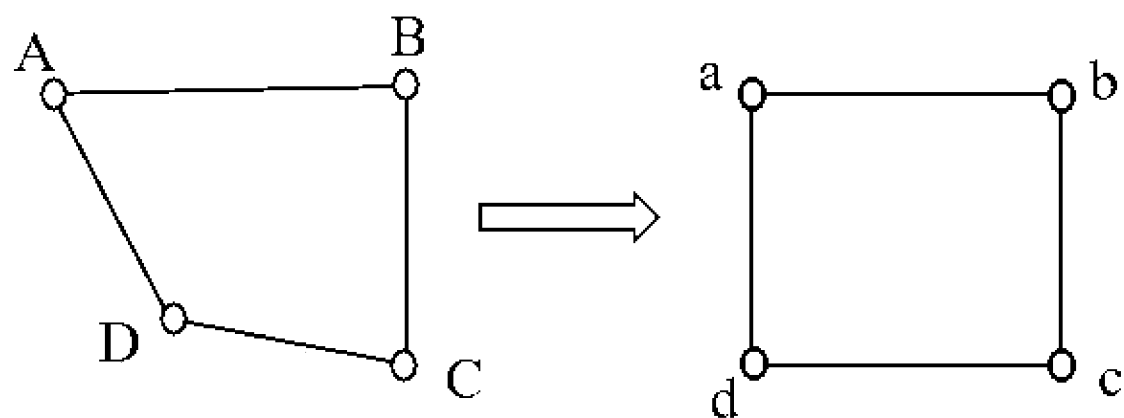
FIG. 5 is a diagram illustrating image projection using a planar homography matrix and four point correspondences.

FIG. 5 illustrates the image projection calculation using the planar homography matrix and four point correspondences, A-a, B-b, C-c and D-d. Each point a, b, c, or d is defined by a respective two coordinates x,y, and points A,B,C, and D are converted to a respective two coordinates X,Y. The computer calculates values of $h_1$ to $h_9$ from the values of x,y and X,Y for the four defined points, yielding data that defines matrix H.

If more than four points are used, Eq. (5) becomes over-determined and a homogeneous estimation method is implemented to estimate the optimal H. Writing the homography matrix, H in vector form as, h={h2, h3, h4, h5, h6, h7, h8, h9}$^T$ Eq (5) for n points becomes:

$$Ah = \begin{bmatrix} x_1 & y_1 & 1 & 0 & 0 & 0 & -x_1X_1 & -y_1X_1 & -X_1 \\ 0 & 0 & 0 & x_1 & y_1 & 1 & -x_1Y_1 & -y_1Y_1 & -Y_1 \\ x_2 & y_2 & 1 & 0 & 0 & 0 & -x_2X_2 & -y_2X_2 & -X_2 \\ 0 & 0 & 0 & x_2 & y_2 & 1 & -x_2Y_2 & -y_2Y_2 & -Y_2 \\ \vdots & \vdots & \vdots & \vdots & \vdots & \vdots & \vdots & \vdots & \vdots \\ x_n & y_n & 1 & 0 & 0 & 0 & -x_nX_n & -y_nX_n & -X_n \\ 0 & 0 & 0 & x_n & y_n & 1 & -x_nY_n & -y_nY_n & -Y_n \end{bmatrix} \begin{pmatrix} h_1 \\ h_2 \\ h_3 \\ h_4 \\ h_5 \\ h_6 \\ h_7 \\ h_8 \\ h_9 \end{pmatrix} = 0 \quad (6)$$

It is a standard result of linear algebra that the vector h that minimizes the algebraic residuals |Ah|, subject to |h|=1, is given by the eigenvector of a least eigenvalue of $A^TA$. This eigenvector is obtained directly from the singular value decomposition (SVD) of A. Putting h back in matrix form, yields the homography matrix, H. The scale s is calculated by substituting the point correspondences, X, x, and the homography matrix H, into Eq (4).

Once all the parameters in the formula of Eq. (5) are obtained, the computer applies the formula of Eq. (5) and converts the displacement in pixel units to that in physical units, or, expressed somewhat differently and more accurately, interprets changes in the pixel positions of a target object that visible in the camera frame images and expresses them as defined displacement measurements of the real target object in real-world units for the associated physical object in the real world.

The computer is set up for the conversion using data of the camera pose input most commonly provided by a human user doing the camera placement, but the data is also at least partly prepared by the computer system once data defining the camera pose and the position of the structure or parts of it in view are entered as input by the user. A detailed summary of practical camera calibration approaches is set out in the article C Z Dong et al., "Structural displacement monitoring using deep learning-based full field optical flow methods", Structure and Infrastructure Engineering 16:51-71, https://doi.org/10.1080/15732479.2019.1650078 (2020), which is herein incorporated by reference.

The result of camera calibration, as has been expressed above, is to provide the computer with data that allows it to identify the target ROIs of the structure being analyzed in the images so as to detect the movement of those target ROIs during loading of the structure and determine what the real-world measurements of those displacements is.

ROI Selection

Figure 6:
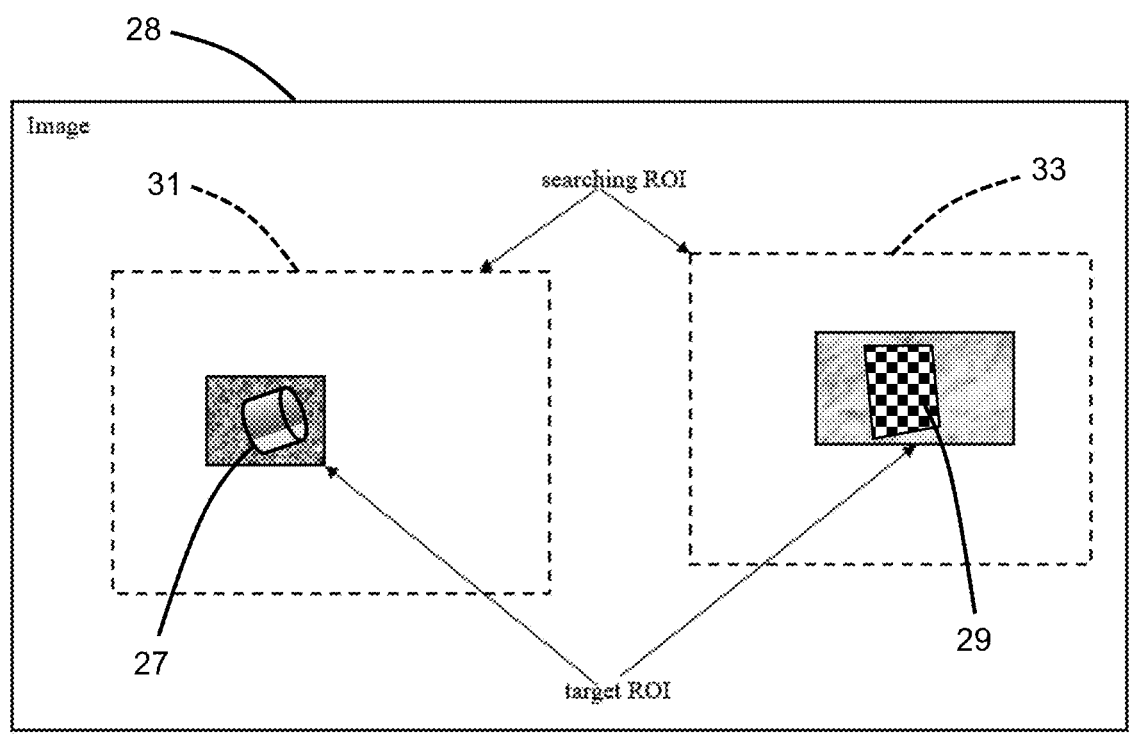
FIG. 6 is a diagram showing an example of Region of Interest ("ROI") selection applied in the invention.

FIG. 6 illustrates how the target ROIs are first selected and determined.

Usually, ROIs are selected by a human engineer, who identifies one or more portions of a structure to be inspected and viewed by the camera that can be used to derive structure movement data that can be meaningfully used to make a condition assessment of the structure.

Target ROIs are the measurement targets that are viewed using the computer to obtain their displacement or velocity. In the monitoring of structural responses under external loads, the measurement targets are always limited to location within respective specific regions if the structures are in good operating status and condition. The setup of the computer for the assessment procedure involves providing the computer with adequate data for the computer to use computer vision to identify the target ROI in the image from the camera 3.

Figure 13:
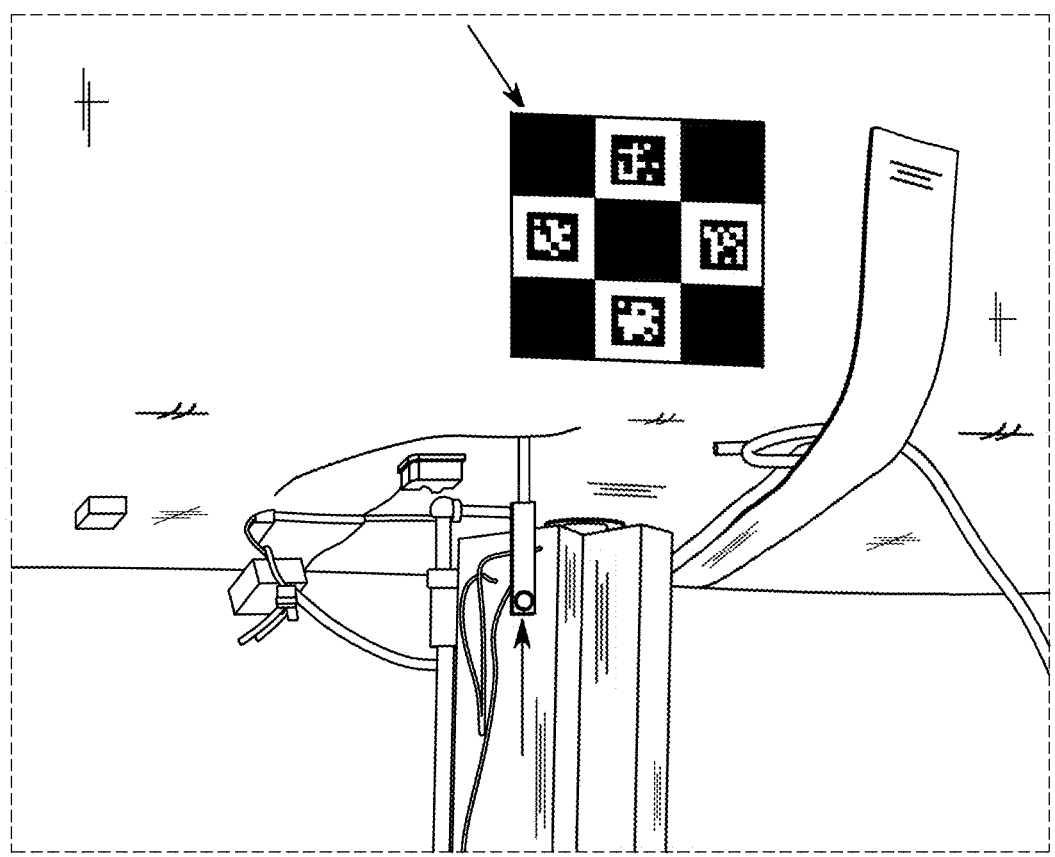
FIG. 13 shows a pattern applied to a monitored structure to provide a target region of interest that aids in computer vision operation according to the invention.
Figure 14:
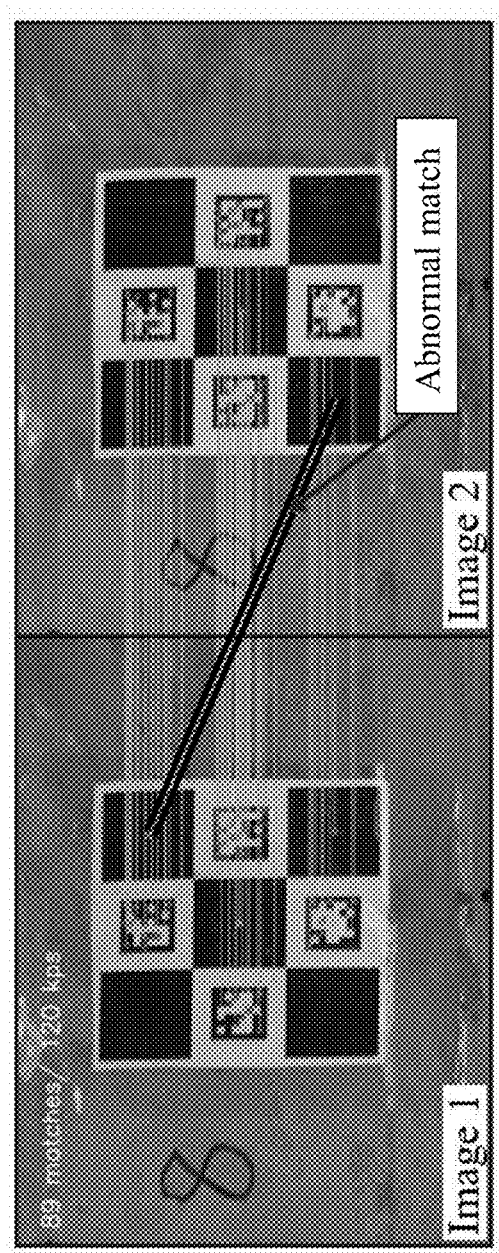
FIG. 14 shows a comparison of two images in which abnormal displacement points on the target areas are located and excluded.
Figure 14:
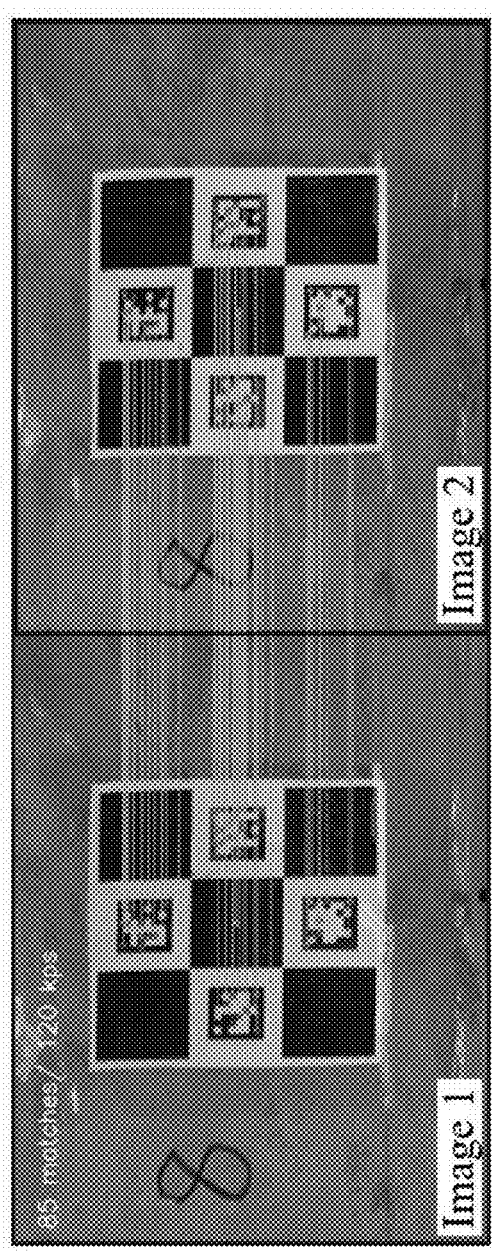

The target ROIs may be defined as manual markers that are applied to the structure on a portion the displacement of which is relevant to the structural health of the structure, such as a girder. Patterns of this sort are exemplified by the checkerboard pattern marker 29, although other patterns are also well known in the art of computer vision, and an example of one such pattern applied to a portion of a bridge is shown in FIG. 13.

The target ROI may also be a structural component that is computer-visible, such as a bolt head or a group of bolt heads on a girder or plate of the structure that are readily extractable from the image from the camera, usually by detection of edges or distinctly colored or illuminated surfaces, as is well known in the art of computer vision.

Each target ROI is identified to the computer by providing data defining its appearance in the imagery from the camera that is viewing it, usually a subset of the pixels from an initial photographic image from the camera of the target ROI that is used by the computer vision program of the computer system to recognize and locate that target object in the subsequent imagery form that camera.

The searching ROIs are selected at system setup, and are each defined by data that defines the specific area or region of the images from the camera that the target ROI is expected to be in at all times during the displacement determination procedure. The target ROI for a given searching ROI will be expected to move in a path during deformation of the structure as it experiences loads that may be applied during the assessment of the structure.

The computer also stores for each of the target ROIs search ROI data defining the region of the image to be searched for that target ROI.

As illustrated in FIG. 6, the entire image 28 from the camera 3 is data defining a field of pixels, preferably as high-definition in resolution as possible. In the setup, one or more target ROIs 27, 29 are identified in the field of view that is contained in the image, and data stored for each defines its appearance in a data format that the computer accesses to locate the ROI in the real-time imagery from the camera.

Each of the target ROIs 27, 29 is assigned a respective searching ROI 31, 33 during setup, and data defining that subfield of the pixels of the image 28 is stored and accessed by the computer during the assessment of the structure 5.

Feature Extraction/Visual Tracking

After the camera calibration 17 and the ROI selection is complete, the computer system is used in real time to assess the structural condition of the structure viewed by the cameras. The first step in this real-time assessment is the feature extraction step 21.

The input to the feature-extraction/visual-tracking/displacement-calculation process is that the data defining the images from the cameras is used by the computer to derive, for each target ROI, displacement data defining its observed displacements from its original position over a period of time of the images, and velocity data defining its velocity during each of the time periods between the images, all in real-world units, e.g., millimeters and seconds. The computer does this using the data defining the target ROIs and the searching ROIs, as well as the setup calibration data for the respective camera associated with the images, as will be described below.

Feature extraction is the identification of the location of each of the target ROIs in the respective searching ROI, and it is performed using computer vision methods known in the art that allow for identification of recognized objects or the associated patters of pixels in images. The identification of the location of each target ROI produces an identification of the pixel coordinates x,y that contain the target ROI in the associated image from the camera.

In the assessment procedure, the computer searches for each of the target ROIs using computer vision in its respective searching ROI for that target ROI, and the visual tracking is conducted by the computer only in the searching ROI, rather than the whole image. The limitation of the search for the target ROI to the associated searching ROI reduces the computational effort needed for the computer vision, and decreases the computation time of the computer for identifying the target ROI for visual tracking.

The computer vision-based displacement measurement uses feature matching to measure the displacement by using the camera to take a video of a measurement region, then estimating the motion of the measurement region in the video using computer vision technologies such as image registration and visual tracking, and then converting the motion in the image to a real-world measurement.

The camera calibration, as described above, derives data defining the relationship between the image pixel coordinates and the real-world objects being viewed by the camera, generally defining how many physical units (e.g., millimeters) in the real world represent a pixel unit in the image. The camera then records the video, or sequence of images, of the structure being monitored, which includes a measurement region, which contains the relevant target ROI and searching ROI.

Image features are required to track the motion of the target ROI. An image feature is a specific sub-region of the image which in general has some special texture or characteristics. The sub-region of the image is also called a feature detector or key point (kp). A feature descriptor is also required to represent the feature detector mathematically for the computer to process, and the feature descriptor is usually defined by stored data as a vector. Different feature detectors and descriptors may be used with different advantages and disadvantages. Generally it has been found that using a SIFT (Scale-invariant feature transform) feature detector and a VGG (Visual Geometry Group in University of Oxford) descriptor improved the measurement accuracy by 24% compared to using the original SIFT feature detector and descriptor, which is a very popular feature extraction algorithm in computer vision. In the preferred embodiment, a SIFT feature detector and VGG descriptor are implemented.

Figure 11:
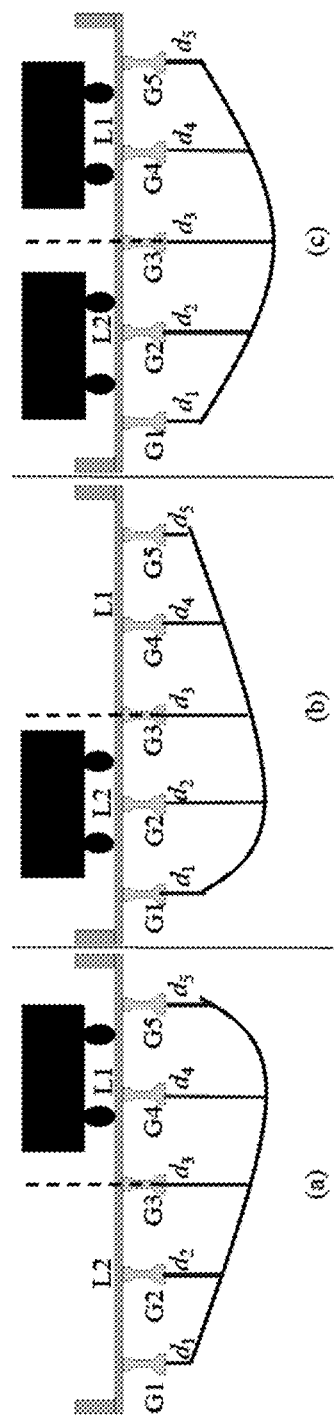
FIG. 11 is a diagram illustrating different deflections of the bridge due to different load lane locations.

Feature matching is then conducted between the images in the video or image sequence, as exemplified in FIG. 11. The feature matching step locates the two most similar features in two images. To estimate the similarity, the distance of the feature descriptors of the two features are calculated, and the smallest distance is determined to be the best similarity. The initial feature matching yields a number of points of correspondence between the target ROIs of two sequential images, as seen in FIG. 11(a), which illustrates 89 points yielded by feature matching. Some of these points may be some abnormal matches, which are apparently wrong matches, and are identified using a RANSAC (RANdom SAmple Consensus) method and removed, yielding a set of reliable points of correspondence, as indicated in FIG. 11(b), where 85 reliable or correct points of correspondence remain.

The number of matched feature pairs shows the performance of the strategy. A higher number means the high matching quality.

The displacement and velocity are calculated by taking the average of the location change of the matched feature points in two images. The displacements in x and y direction, X and Y, in physical unit are calculated by the formula:

$$\begin{cases} X_i = SR_x \dfrac{\sum_{j=1}^{n}(x_i^j - x_1^j)}{n} \\ Y_i = SR_y \dfrac{\sum_{j=1}^{n}(y_i^j - y_1^j)}{n} \end{cases} \quad (7)$$

where $(x_i^j, y_i^j)$ and $(x_1^j, y_1^j)$ are the image coordinates of the jth matched feature point of between the ROIs of Frame i and Frame 1, n is the total number of the matched feature points between the ROIs of Frame i and Frame 1, and $SR_x$ and $SR_y$ are the scale ratio in the x and y directions, respectively. The velocities in the x and y directions, VX and VY, are calculated in physical units by the formula:

$$\begin{cases} V_X = SR_x \dfrac{\sum_{j=1}^{m}(x_i^j - x_{i-1}^j)}{n \cdot \Delta t} \\ V_Y = SR_y \dfrac{\sum_{j=1}^{m}(y_i^j - y_{i-1}^j)}{n \cdot \Delta t} \end{cases} \quad (8)$$

where $(x_i^j, y_i^j)$ and $(x_{i-1}^j, y_{i-1}^j)$ are the image coordinates of the jth matched feature point between the target ROIs of Frame i and Frame i−1, and $\Delta t$ is the time interval of the image sampling which is the reciprocal of the sampling rate.

The procedure here for vision-based displacement/velocity measurement method using feature matching is implemented by using Python programming language and OpenCV (Open Source Computer Vision Library). The reason for the programming language selections is that they are open source and free for users, and it is easy to employ Python and OpenCV to develop a user-friendly software. The image data acquisition device used is a customer-grade portable camera and the camera can be employed to achieve multiple points of measurement for multiple ROIs. The total cost of the proposed monitoring system is an order of magnitude lower than conventional sensor-based monitoring, with the associated sensors, cable, data acquisition module and commercial software.

Visual tracking uses real time image data, including the image sequences and videos of the measured structures, to track the location changes of the measured targets, i.e., from the extracted features, in pixel units. The selection of the type of visual tracking performed by the computer provides a fully structure-oriented computer-vision-based structural response monitoring. In the preferred embodiment, the visual tracking method includes digital image correlation-based template matching, feature point (also called keypoint) matching, optical flow and/or spatial temporal context tracking methods.

The visual tracking methods of the system generate data regarding the location in the real world of the ROIs of the structure being analyzed and from which motion information data, including displacement and velocity between the images of an image sequence or video, are extracted, with the units thereof expressed in a number of pixels.

Two methods of visual tracking are conducted with the camera video image sequences to derive the displacement calculation for a given target ROI in pixel units.

Figure 7:
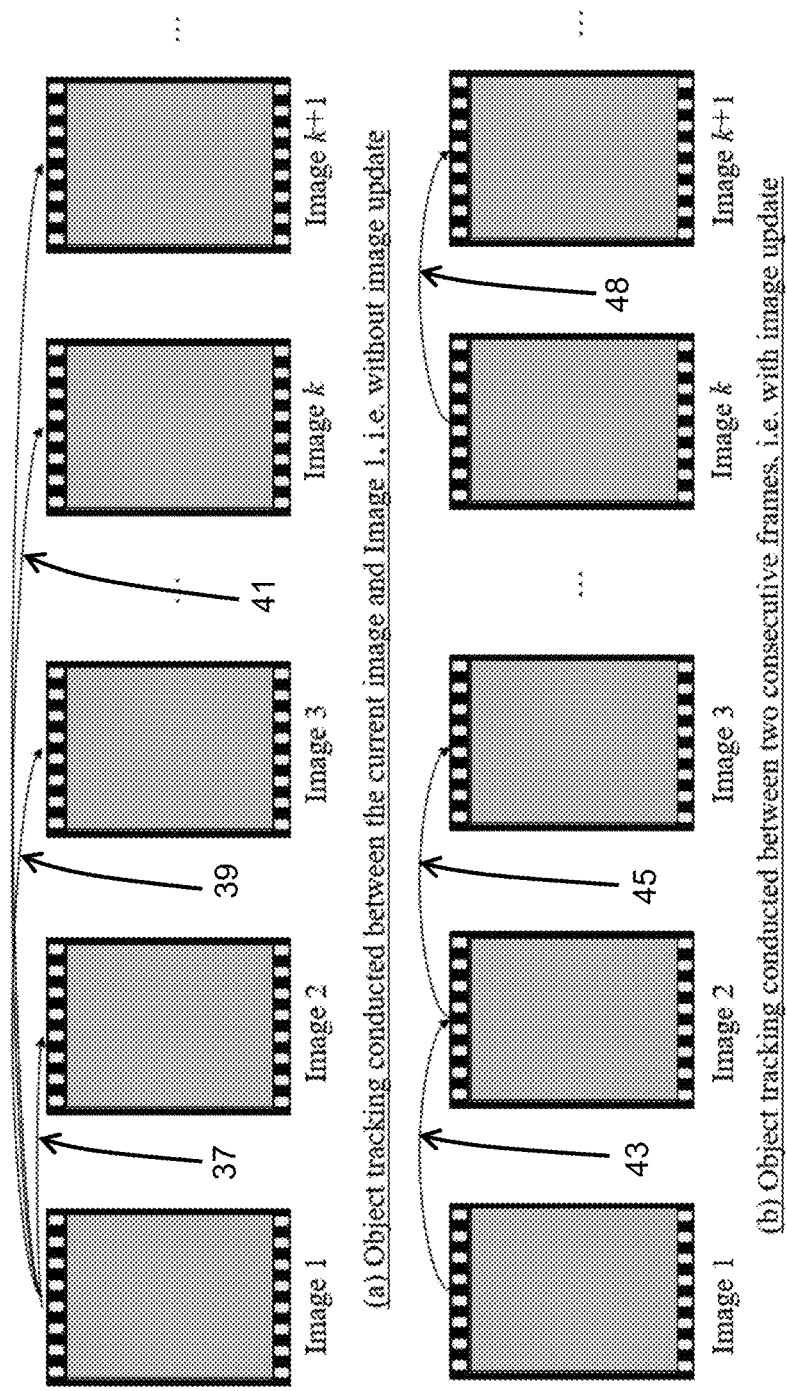
FIG. 7 is a diagram illustrating two different strategies of visual tracking for displacement calculation conducted using image sequences.

As illustrated in FIG. 7(a), in a first method, the visual tracking is conducted between the current image and the first image, i.e., Image 1. That means that during the visual tracking the first image is not updated, and a series of displacement determinations are made for each the subsequent images of the video, i.e., Images 2 to k+1, that track the ROI and derive a displacement of the target ROI in the image relative to the original location of the target ROI in Image 1. In other words, a first object-tracking comparison indicated at 37 is made between Image 1 and Image 2. The next comparison 39 is between Image 3 and Image 1, and each subsequent comparison 41 of an Image k or Image k+1 is also compared with Image 1 to determine the relative displacement. The displacements at Image k are referenced here as $\Delta x_1^k$ and $\Delta y_1^k$.

As illustrated in FIG. 7(b), in a second method, the visual tracking can be conducted using two consecutive images as the stream of images is received by the computer. That means that during the visual tracking the images are always continually updated. The displacements of a target ROI in horizontal and vertical directions are derived from comparisons 43, 45, and 48 between the two consecutive images, i.e., comparing Image k+1 and the immediately preceding image Image k. The resulting data are referenced here as $\Delta x_k^{k+1}$ and $\Delta y_k^{k+1}$ where k=1, 2, 3, . . . . The displacements at Image k are determined as $$\sum_{i=2}^{k} \Delta x_{i-1}^j \text{ and}$$

$$\sum_{i=2}^{k} \Delta y_{i-1}^j,$$

where $\Sigma$ is the sum operator. Assuming that the images are uniformly sampled at a constant sampling rate over time, and the sampling rate is F, the x and y direction velocities of the target ROI at Image k may be expressed as $F*\Delta x_k^{k+1}$ and $F*\Delta y_k^{k+1}$. The second method allows accumulation of errors during the summation procedure. The first method does not have this problem, and it directly obtains the displacement. The second method, however, directly determines the velocity at the time of an image without using a numerical derivative.

Displacement Calculation

After the displacements or velocities are obtained in pixel units, the computer uses the stored calibration data that correlates the pixel locations to real-world locations, and, using that data, converts the pixel-based displacement or velocity data of the target ROI into real-world displacement or velocity data defining the displacement or velocity in real-world physical units, such as millimeters, using the calculations defined by the formulas of Equations (1) to (6).

After derivation from the camera images of data regarding the real-world displacement or movement of relevant target ROI regions of the structure being assessed, that data is then assessed by the computer system, locally or remotely, so as to derive condition data that corresponds to a maintenance condition of the structure, and that condition data is output to a user for action, if necessary, as set out below.

Computer Vision-Based Structural Vibration Serviceability Assessment

The displacement and velocity data from the feature-extraction/visual-tracking/displacement-calculation process are then used by the computer system 7 to derive data corresponding to an assessment of the structure being examined. The assessment generally will be either
  a. an assessment of whether the accelerations are outside predetermined permissible-standard ranges of acceleration for parts of the structure, or
  b. an assessment of whether the displacements of the target ROIs indicate a distribution of loading that may be indicative of structural deficiencies in the structure; or
  c. a load rating factor according to conventional rating standards.

According to current standards, acceleration data is utilized to perform vibration serviceability assessment, and most of the indicators for vibration serviceability assessment are related to acceleration. As mentioned above, conventional sensors such as accelerometers have a drawback in that large amounts of effort in terms of the cost, time and labor forces for the sensor installation and data acquisition are required.

In contrast, in the present system, a computer-vision-based vibration serviceability assessment is performed that derives the acceleration data for the structure without those problems of prior art systems.

Figure 8:
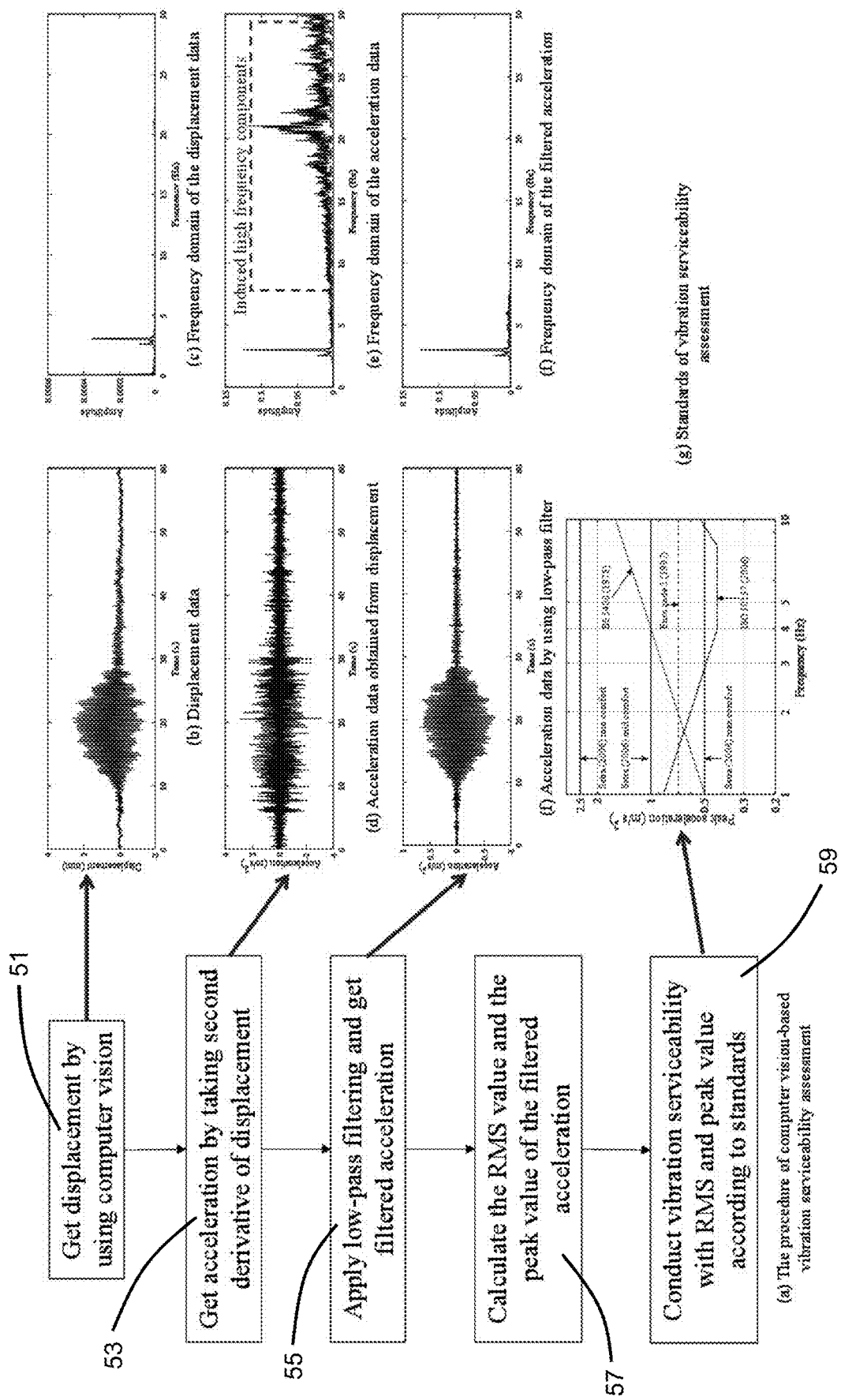
FIG. 8 is a diagram illustrating the process of computer vision that derives acceleration data for the structural vibration serviceability assessment.

As set out in the diagram of FIG. 8, in step 51 the computer-vision-based system uses displacement measurement methods to derive displacement data (b) regarding the target ROIs from computer-vision processing of the videos of structures, as described above.

After this, in step 53, the computer system applies software-implemented numerical computation methods implemented by software to derive second derivatives of the obtained displacement data (b) in the form of acceleration data (d). However, due to the nature of the numerical derivative calculation, the data includes high-frequency-noise components data (e) that are induced. The acceleration data (d) is processed with a computer-software-implemented low-pass filter in step 55, which removes the high frequency components (e), yielding a result of filtered acceleration data (f).

In step 57, using the filtered acceleration data (f), root-mean-square (RMS) values and the peak values of the acceleration time histories are calculated. From those RMS and peak values, vibration serviceability is calculated according to the current standards in step 59, which will be described below.

The computer determines from the resulting analysis of the filtered acceleration data derived by the computer-vision system is within acceptable parameters for the structure or outside of them, and outputs a report on the monitor via some other output device or medium of that assessment of the structure.

Diagram (g) of FIG. 8 displays, as an example, some standards for footbridges, such as the ISO standard (ISO 10137), Euro code 5, British standard (BS5400) and French standard (Setra) (Dong et al. 2020). The system is also suitable for other types of structures, such as buildings and stadiums, and the corresponding standards such as ISO 2631-1 are to be utilized. These standards define the thresholds at different levels based on the accelerations to assess the serviceability levels, as is well known in the art of structure safety analysis.

The result of this analysis is whether the accelerations detected for the ROIs fall outside the permissible ranges of the applicable standards. If so, a warning is output indicating the condition of the structure potentially having a problem, with whatever additional data identifying the problem is desired by the user. If the accelerations are not outside the permissible ranges, the structure's satisfaction of the acceleration standard is output to the user.

Bridge Load Distribution Estimation and Load Rating

Generally, a regular bridge inspection every two years is mandated by the state's Department of Transportation (DOTs) and Federal Highway Administration (FHWA) in the US, and the related agencies in the other countries. The biennial bridge inspection relies on a visual inspection, which is well accepted and codified throughout the industry. However, it takes a large amount of time, cost, and labor force to do visual inspections, and the results rely heavily on the subjective justifications and experiences of the inspectors.

Load rating is one of the important approaches for condition assessment of bridge structures and it can provide a quantitative indicator—the rating factor—to evaluate the load carrying capacity of bridges. Load rating is a measure of safe live load carrying capacity of a bridge, which is generally used by the bridge owners to perform decision making, including retrofit, repair, and load posting to limit vehicular loading.

The basic idea of load rating factor (RF) can be expressed as "RF=(Capacity−Dead load Demand)/Live Load Demand". The calculations of capacity and dead load demand are static problems and are easily converted to plane analysis according to the properties of dead loads. However, determination of the distribution of vehicular live load on bridges, which expresses how the live load transfers from a vehicle to the bridge slab and girder sections, is a more complex determination.

Lateral live load distribution is the key when doing advanced analysis for load rating, which represents the structural strength and serviceability of bridge structures. The procedure of calculating a lateral live load distribution factor is to convert a three-dimensional (3D) load distribution problem to a two-dimensional (2D) or one-dimensional (1D) problem. The way of estimating the live load lateral distribution problems also leads to different methods of load rating.

In current research studies and practices, there are two major types of methods to perform bridge load rating: simplified methods and detailed analysis using finite element model (FEM) methods. In both types of methods, the calculations of distribution factors directly affect the results of the load rating. The simplified methods generally can be used to conduct beamline analysis with lateral distribution, which considers the geometry information of the bridge, such as girder spacing and span length, and the relative stiffness of the slab-girder system.

For example, the specifications published by the American Association of State Highway and Transportation Officials (AASHTO) such as AASHTO standard specifications for highway bridges and AASHTO Load and Resistance Factor Design (LRFD) bridge design specifications summarize the empirical formulas to calculate the lateral live load distribution to perform beamline analysis. Beamline analysis means to analyze a beam/girder over multiple spans under the vehicle load and multiply the response by the distribution factor (DF). The load distribution and load rating calculation presented in the AASHTO standard and LRFD specifications provide simplified ways to estimate the load rating capacity in the design stage. During the bridge operation stage, the load distribution and rating still follow the same procedure as stated in the design stage, but the impact factor for demand (related to dead loads and live loads) and the resistance factors (related to capacity) have to be modified based on the wearing surface condition evaluation, field inspection, or maintenance of the structural component members according to the AASHTO Manual for Bridge Evaluation or National Bridge Inspection Standards Regulations (NBIS). These types of simplified methods derive the results, which are indicated to be more conservative than the actual bridge status and may not incorporate real structural properties.

The other type of methods, FEM based load rating, reflect more about the actual cases of bridge structures than the simplified methods. The lateral live load distribution can be delicately analyzed with FEM, and the load transfer in the lateral section from the vehicle to the slab and then to the girders is much clearer.

As the distribution factor is much closer to the actual loading behavior, which means smaller distribution factors compared to that from the simplified methods, the load rating factor can be increased and the expenses on primary bridge members can be reduced. It can also prevent the earlier load permit posting during the whole bridge operation stage. However, detailed 2D FEMs are necessary for the load rating purposes, which would take large amounts of time, effort, and expertise. To ensure the reliability and accuracy of the FEM, the FEM has to be calibrated/updated by the information from field tests, e.g., static and dynamic load tests. During the load testing, traffic closure, testing truck arrangement, sensor instrumentation, and cable wiring work are required. Although they are routine activities, they demand large amounts of efforts in engineering practice.

The present system is simpler, more practical, and a more reasonable approach to estimating a bridge distribution factor for load rating. The bridge load rating for the purpose of structural condition assessment with cost-effective and convenient solutions provides an important support for the operation compliance of infrastructure system in the development of future smart cities.

An aspect of the system of the invention provides a practical approach for bridge load distribution estimation and load rating using computer vision, which is beneficial for the engineering practices when compared to the current load distribution estimation and rating approaches.

Figure 9:
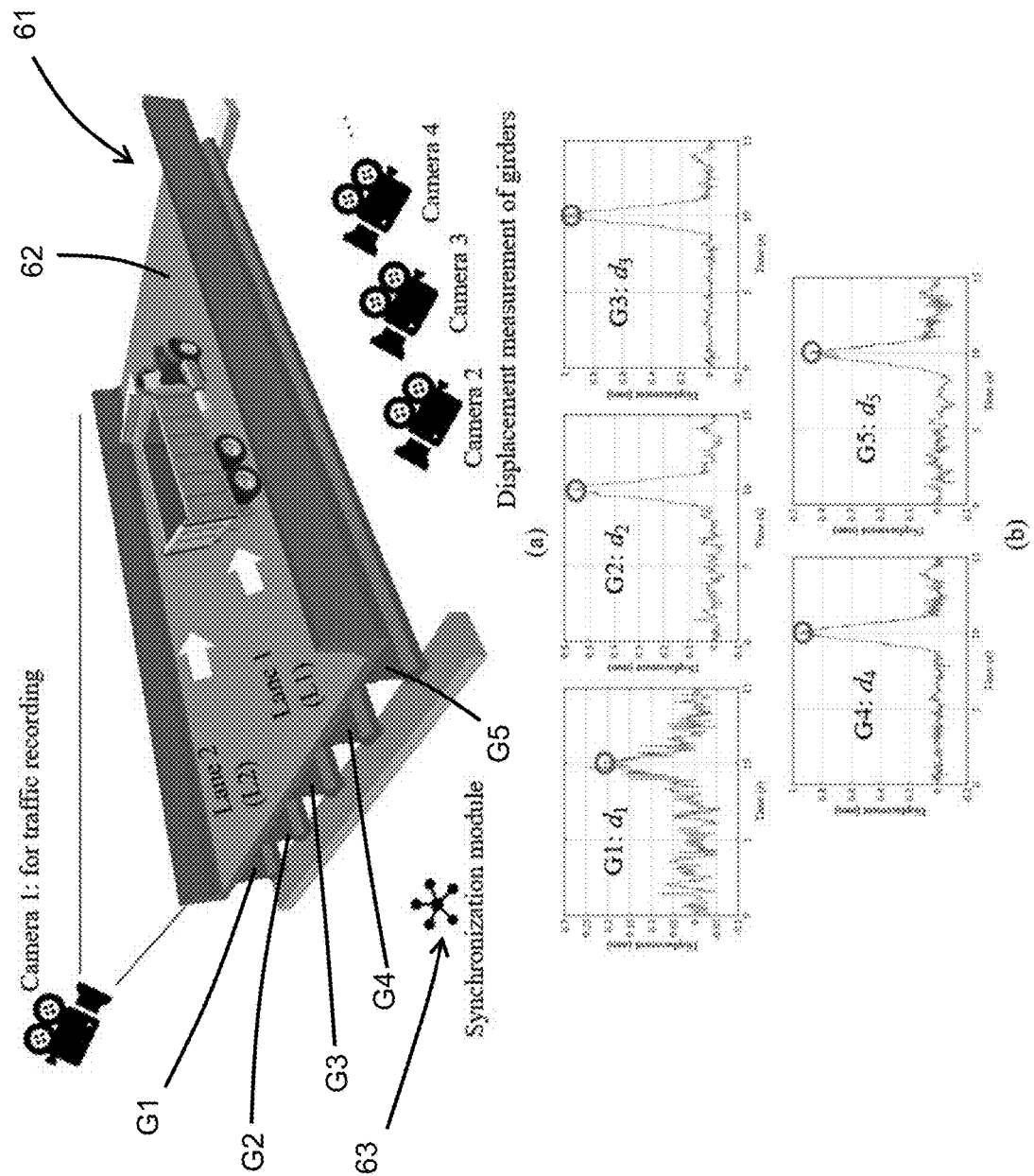
FIG. 9 is a diagram illustrating a bridge load distribution estimation and load rating system using cameras and computer vision with exemplary outputs of displacements of the individual girders of the bridge.
Figure 10:
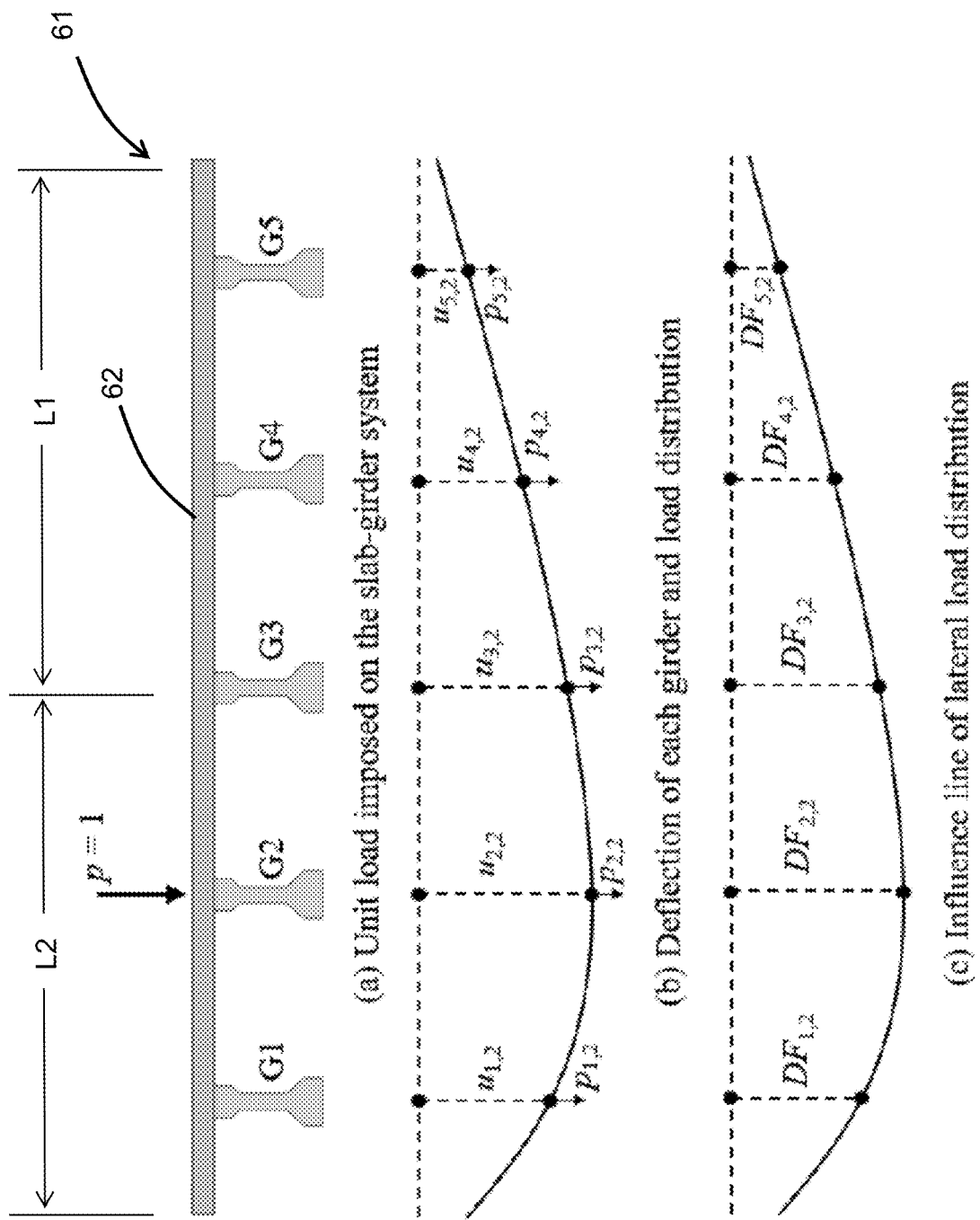
FIG. 10 is a diagram illustrating the analysis of a bridge girder system and its deflections under loading.

As shown in FIGS. 9 and 10, an exemplary bridge 61 comprises a bridge deck 62 having lanes L1 and L2 on which a vehicle or vehicles travel. Referring to FIG. 10, bridge deck 62 is supported on longitudinal girders G1 to G5 that are spaced laterally and extend between supported longitudinal ends. The girders G1 to G5 support the loads on the bridge deck 62, such as load p, applied at a lateral position on the deck. The imposition of the load p results in a lateral load distribution and downward deflection of all of the girders, seen in FIG. 10(b). The lateral load distribution is associated with an influence line, seen at FIG. 10(c).

Referring again to FIG. 9, the system for assessing a structure such as bridge 61 employs multiple cameras including Camera 2, Camera 3, and Camera 4, or more, that monitor the displacements of the girders G1 to G5 of the bridge in the same cross section, i.e., the same longitudinal location on each girder. Each girder G1 to G5 has a respective target ROI in that longitudinal region providing for a computer-vision detection of the displacement or deflection of the associated girder at that point. As many cameras as desired may be used, with one camera per girder or with a camera viewing ROIs on two or more or all of the girders.

Another camera, i.e., Camera 1, monitors a vehicle or vehicles on the bridge deck and detects which lane, e.g., Lane 1 and Lane 2, the vehicle is on. The computer system 7 also uses a computer vision method to detect the vehicles when they are in the images captured by Camera 1.

The information regarding the vehicle is very important structural input information for structural condition assessment, load distribution assessment, and load rating. All the cameras are connected with and synchronized by a synchronization module 63 to provide precise timing of all movements of the structural components being measured. The system relies on the detection of the vehicle and data indicating its presence and location, especially which lane it is in, on the structure to process the velocity and acceleration data of the target ROIs.

FIG. 9(b) illustrates exemplary displacements ($d_1$ to $d_5$) measured over time of the five girders G1 to G5 in the same cross section of a bridge when a vehicle (denoted as T1) is on one lane. The determined displacements have to be in the same cross section, i.e., at the same longitudinal position on the girder, and it is assumed that the vehicle load distribution effect along the longitudinal direction is the same. The distribution factor of the vehicle load on the ith girder, $DF_i$, can be determined by the following formula:

$$DF_i = \frac{d_i}{\sum_{j=1}^{n} d_j} \qquad (9)$$

where n is the total number of the girders and j is the number of the girder.

FIG. 11 shows three different basic vehicle-loading scenarios. Scenario (a) has one vehicle on the right lane L1, and scenario (b) has a vehicle on the left lane L2. Scenario (c) has vehicles on both lanes. The resulting distribution of load and displacements of the girders expected is shown below each scenario illustrated.

It should be noted that the formula of Equation (9) is suitable for the cases when there is only one vehicle on the bridge deck, either on Lane 1 or Lane 2, as shown in scenario (a) and (b). It is also suitable for the case when there are two vehicles with the same configurations including same load pattern, same speed and same appearance on the bridge cross section, as shown in FIG. 10, scenario (c). This scenario is very hard to achieve during daily traffic. A big advantage of the system here described is that the load distribution and conduct load rating can be estimated during normal traffic, and it is not necessary to stop traffic to do the load test.

The method of assessment in single-vehicle scenarios, as shown in FIGS. 10(a) and (b), is therefore preferable in the system here. For the multiple-lane load presence as shown in FIG. 10, scenario (c), or other occasions of multiple vehicle loads on multiple lanes, the system applies a superposition of the single lane load scenarios.

Figure 12:
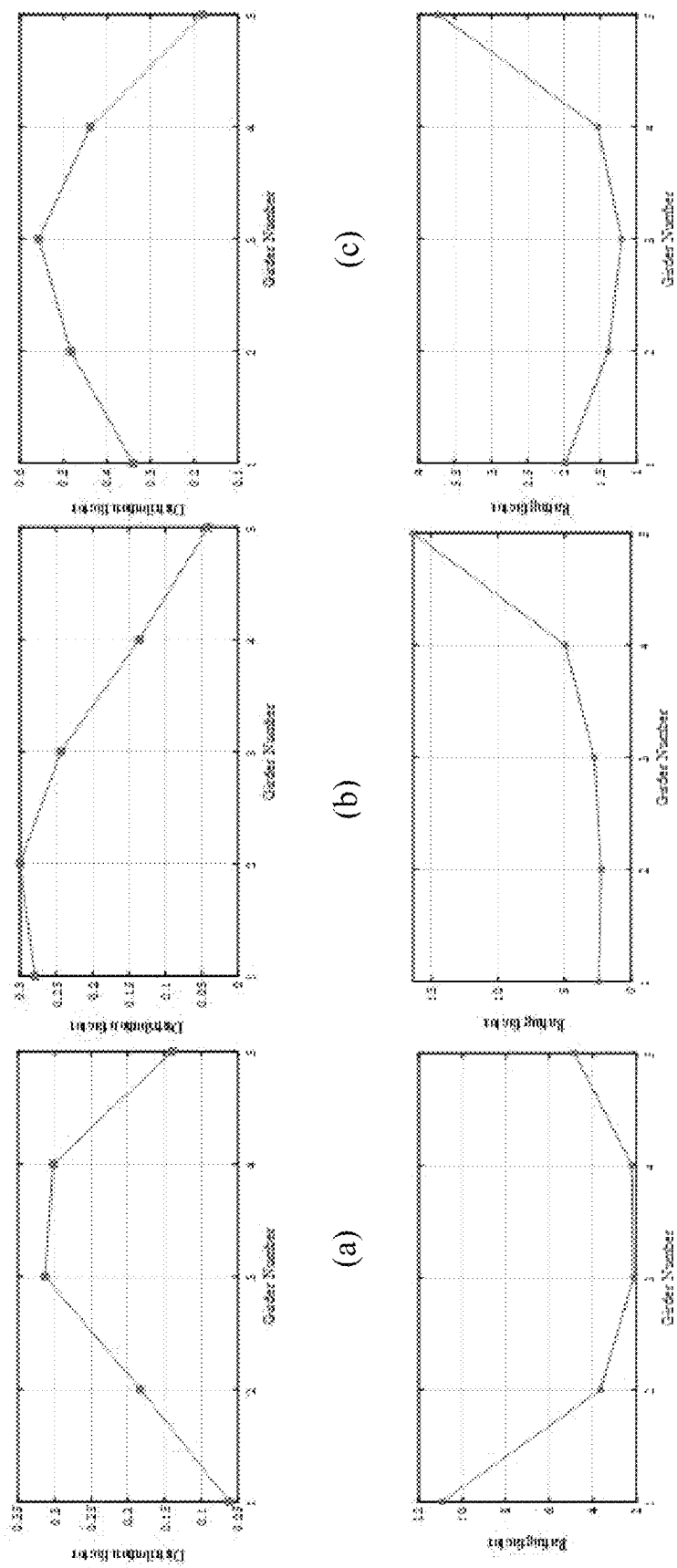
FIG. 12 shows graph representations of the estimated load distribution factors for each girder in the different lane-load scenarios shown in FIG. 11.

FIG. 12 graphs (a) and (b) show the estimated load distribution factor of each girder of the vehicle on a single lane. FIG. 12 graph (c) shows the load distribution factor of each girder with two vehicles on two lanes of the bridge by using the superposition, or combination by addition, of the single lane load cases shown in FIG. 12 graphs (a) and (b). Once the load distribution factors are estimated, the vehicle load on each girder can be projected using an allocation of the distribution factors.

The load distribution estimation is computed using the camera-based analysis, where the ROI's for each parallel girder are tracked for synchronized deflection. The deflections of girders obtained, converted from the pixel to engineering unit calculation, are employed to compute distribution estimation according to Equation 9. This computation can be done automatically by the computer or manually by the engineer.

Where one or more of the actually-determined girder deflections depart from one of these expected patterns by a predetermined amount, i.e., a maximum permissible distance departed from the expected distance on the pattern based on the other girder displacements, it is an indication of a structural problem that is interfering with the lateral load transfers of the structure, and a negative assessment data flag or other data indicating structural problems, is set and output to the human system user.

For determining the structural health of the structure in terms of a load rating factor, the load rating factor is calculated using the formula below:

$$RF = \frac{\phi_c \phi_s \phi - \gamma_{DC} DC - \gamma_{DW} DW m \gamma_p P}{\gamma_L (LL + IM)} \quad (10)$$

where $\phi$ is the load and resistance factor design (LRFD) resistant factor, $\phi_s$ is the system factor for redundancy, $\phi_c$ is the optional member condition factor which is based on visual inspections, R is the structure resistance, DC is the dead load, DW is the wearing surface load, P is the pre-stress load, LL is the live load, IM is the impact effect, and $\gamma_{DC}$, $\gamma_{DW}$, $\gamma_p$, and $\gamma_L$ are the factors for different loads. A detailed explanation of this formula can be found in AASHTO LRFD Bridge Design Specifications.

In the present system, the load rating factor of moment is selected for the demonstration and R, DC, DW, P, LL, and IM in Eq. (8) refer to moments. FIGS. 9B(i) to (k) show the load rating factors that are obtained. The distribution factor obtained using computer vision-based analysis is employed to modify the live load given in the denominator of Equation 10. The modification of live load is done as specified in AASHTO Bridge Design Specifications. The other deadload and capacity computations are also carried out by the computer system as specified in AASHTO Bridge Design Specifications as well. Finally, the serviceability analysis of the bridges can be carried out using the computer-vision based deflections. The deflections obtained in FIG. 10(b), are compared to design code based deflection limits (such as L/800 without pedestrians, where L is the longitudinal girder span length).

Another approach for structures (bridges or other structures) can be obtained based on accelerations obtained from deflection time histories using computer vision. The time histories at ROIs are derived in pixel units, then converted to real-world displacement units, and finally corresponding accelerations are calculated using numerical integration of the displacement time histories twice. Once the acceleration time histories are obtained using the computer vision based methods, different formulations from different specifications (ISO, Eurocode, British Standards, etc.) can be computed either automatically in the computer or manually by the engineer to determine the serviceability limits.

In addition to the above assessments, the system also can determine a structural problem when a given component in structure, or a target ROI, experiences a deflection or displacement during loading that exceeds a predetermined threshold value for displacement of that component. The threshold value can be based on serviceability limit (e.g., the threshold deflection is L/800) or based on an engineer's judgment for distributions factor limit (e.g., the threshold deflection is a distribution factor (DF) set by an engineer) or based on peak acceleration limits of any kind in parallel to ISO, British Standards (BS) or EuroCode. This may be a single point deflection time history, i.e., deflection $d_i(t)$. Acceleration time history $a_i(t)$ is determined by $$a_i(t) = (d^2(di(t))/(dt^2) \quad (11)$$

and then $a_i(t)$ is fed into ISO, BS, or Eurocode or any design serviceability specifications. Generally where there is a single point monitoring, a negative or problem assessment is determined where the deflection $d_i < d_{threshold}$, where $d_{threshold}$ is determined and derived based on design specifications for the structure, computer model results, or historical data.

For a multiple girder structure, such as the bridge shown here, the Distribution Factor, DF for all girders must be less than a threshold, i.e., Distribution Factor, $DF_i < DF_{threshold}$, where $DF_{threshold}$ is based on design specifications, computer model results, or historical data. In addition, the Intergirder Deflection Index, IG, determined as $d_{i+1} - d_i$ must be below a threshold, i.e., $d_{i+1} - d_i < IG_{threshold}$ for all values of i up to the number of girders. $IG_{threshold}$ is also based on design specifications, computer model results, or historical data. Both of these threshold values must be satisfied for a positive assessment of the structure. If either threshold is exceeded, a problem assessment will be made by the system.

Figure 15:
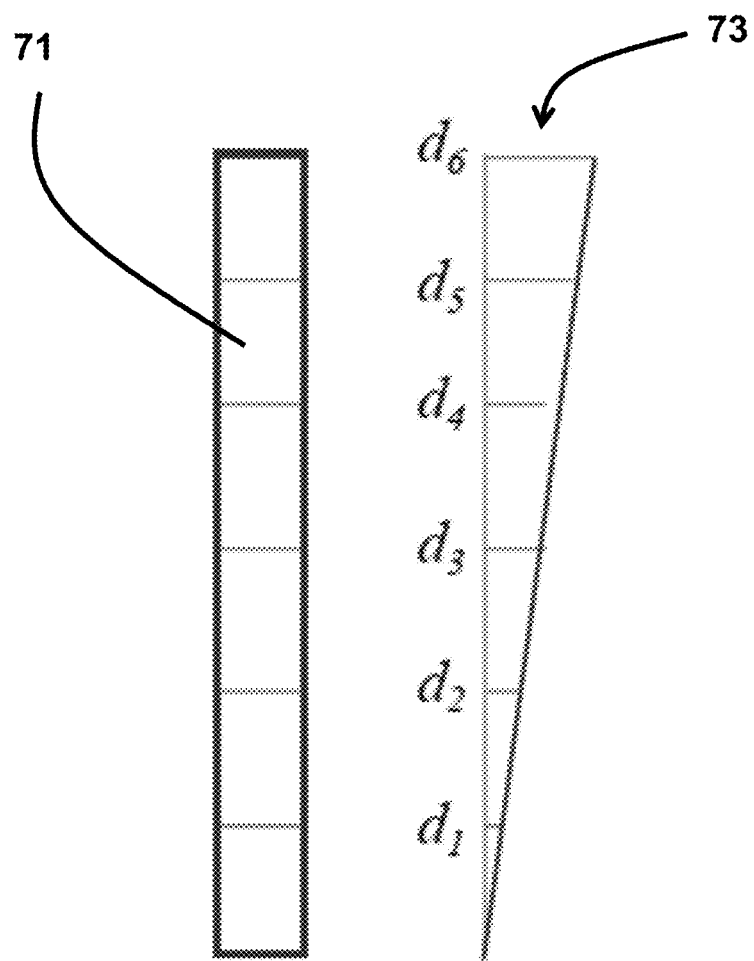
FIG. 15 is a diagram of a building deflection.

Another structure that may be assessed is a vertical building, as illustrated in FIG. 15. Building 71 experiences lateral deflection 73 over its height, indicated as $d_i$ for i from 1 to 6 in the figure, which are detected at target ROIs of the building over its height by one or more cameras, generally as has been described here. For a positive assessment, all deflections must be below a threshold, i.e., Deflection $d_i < d_{threshold}$ for all values of i. In addition, the building's Interstory Deflection Index IG must be below a threshold level, i.e., $d_{i+1} - d_i < IG_{threshold}$ for all values of i. Both $d_{threshold}$ and $IG_{threshold}$ are also based on design specifications, computer model results, or historical data. is based on design specs, computer model results, or historical data. Both requirements must be satisfied for a positive assessment, and if either threshold is exceeded, a problem assessment will be made by the system.

Responsive to any such a determination of a problem with the structure being analyzed, the computer outputs an indication of the assessment problem and preferably identifying the component having a potential mechanical issue.

Output of Results

After the derivation of the motion data from the camera imagery and the subsequent assessments of the condition of the structure are derived by the computer system, an output of the results is made to the user through a monitor, printout, or other communication method. The report may be output locally to an inspector at the structure's location or remotely to another location for review by personnel.

The output may be a simple pass/fail indication for the structure, but it preferably is a detailed report of the movement measurements and the specific components of the structure that require further attention. The output typically includes the load rating factor and a structural vibration serviceability rating. Additional output of other data may also be made.

The present system is a comprehensive system for structural health monitoring at a global level using computer vision technology. The core steps for the developments are for structural monitoring, structural identification and condition assessment on civil infrastructure systems. This system can also better support the current research study and engineering practices of structural health monitoring and structural identification, and support the asset owners and managing departments for better decision making of condition assessment, maintenance, repair and retrofit.

The system provides a computer vision-based structural vibration serviceability assessment approach that eliminates or reduces the use of conventional sensors for vibration serviceability assessment and provides a more effective, rapid and practical solution by combining the computer vision-based monitoring and current assessment standards. This system provides a practical load distribution and bridge load rating approach using computer vision, and can estimate the load distribution under normal traffic loads and provide a much more reasonable estimation compared to the conventional methods suggested by AASHTO standards. The method herein effectively utilizes the structural input and output information that is extracted from image data using computer vision to conduct structural analysis, load distribution estimation and load rating. It does not need a detailed finite element model or a dedicated load test, and it can give acceptable load rating and bridge load-carrying capacity evaluation in a practical, rapid, effective and efficient way.

The system described differs from the current structural monitoring using computer vision techniques in that it has a comprehensive solution for different monitoring scenarios and structure types using various visual tracking methods and provides a superior approach for structural vibration serviceability assessment, load distribution estimation, bridge load rating. The system is a more cost-effective, rapid, practical, effective and efficient solution for structural health monitoring and condition assessment when compared to the conventional approaches.

The technology described herein offers significant contributions to the structural health monitoring, performance and condition assessment of civil infrastructures for effective and efficient asset management, maintenance, and decision making of the owners and managing departments, agencies in the U.S. as well as other countries. It provides a non-contact solution for structural response monitoring and condition assessment, with faster and more cost-effective structural response monitoring with different types of structures, and faster effective structural vibration serviceability assessment. The system also provides rapid and practical bridge load distribution estimation and load rating solution, and a comprehensive structural performance and safety evaluation and condition assessment solution.

The terms used herein should be read as terms of description rather than of limitation. While embodiments of the invention have here been described, persons skilled in this art will appreciate changes and modifications that may be made to those embodiments without departing from the spirit of the invention, the scope of which is set out in the claims.

What is claimed is:

1. A computer-vision-based method for determining load worthiness, safety, and/or serviceability of a structure, said method comprising:
    directing one or more cameras at the structure so as to derive therefrom image data defining a series of images of target portions of the structure;
    receiving the image data at a computer system;
    applying a computer vision process performed by said computer system to said image data so as to derive location data from the image data, the computer vision process being a feature-extraction process in which location data from the target portions are derived from key points in the images such that said location data corresponds to locations of the target portion in each of said images; determining displacement data from the location data for the target portions by comparison of the location data for each of the target portions with respective original location data for each of the target portions; determining a safety and/or serviceability assessment for said structure from said displacement data, wherein determining of the safety and/or serviceability assessment for said structure includes comparison of the displacements of each of the target portions to an estimated displacement distribution, and determination of a structural problem for said assessment responsive to a determination that the displacement of one or more of the target portions deviates from the estimated displacement distribution by more than a predetermined limit; and outputting a report of the safety and/or serviceability assessment.

2. The computer-vision-based method of claim 1, wherein the determining of the safety and/or serviceability assessment for said structure includes deriving from the location data velocity data and acceleration data indicative of, respectively, a real-world velocity and a real-world acceleration of the of the target portion.

3. The computer-vision-based method of claim 2, wherein the safety and/or serviceability determination includes comparing said displacement with a predetermined maximum displacement for said target portion, and
    wherein said safety and/or serviceability assessment includes an indication of a potential problem with the structure responsive to a determination that the displacement in greater than said predetermined maximum displacement.

4. The computer-vision-based method of claim 1, wherein the structure is a bridge having a plurality of longitudinally extending, laterally spaced girders, said target portion being at a longitudinal distance along one of the girders, and
    said camera or another camera or cameras providing image data defining a series of images of other target portions of the structure that are each located on a respective one of the other girders at the same longitudinal distance therealong such that the target portions are generally aligned laterally; and
    said applying of the computer vision process performed by said computer system derives location data for the other target portions from the image data corresponding to locations of the target portion in each of said images, said location data being indicative of a deflection of the respective girder.

5. The computer-vision-based method of claim 1, wherein the method further comprises calibrating the computer system such that the computer system has stored accessible thereto calibration data providing for conversion of distances of pixels in the images to real-world distance units.

6. The computer-vision-based method of claim 5, wherein the images are digital data defining pixels of the images, and the location data is derived from a location of the target portion as a pixel location thereof in the image, said pixel location being converted to real-world units using the calibration data.

7. The computer-vision-based method of claim 1, wherein the computer vision process includes applying computer vision to locate the target portion in the image by searching only within a predetermined searching area smaller than the image.

8. The computer-vision-based method of claim 1, wherein the target portion is marked with a pattern that makes said target portion readily visible to the computer vision process.

9. The computer-vision-based method of claim 1, wherein the target portion is a structural component of the structure that is selected due to visibility thereof to the computer vision process.

10. The computer-vision-based method of claim 1, wherein the system has at least two of said cameras each producing a respective series of images of respective target portions of the structure at a sequence of equally spaced points in time, and the computer vision process comprises
performing a comparison, for each of the target portions, of a pixel location of the target portion in a first of the images with pixel locations of said target portion in the images later in the series of images and deriving for each of the target portions from said comparison one or more displacement data values as a number of pixels in the associated image.

11. The computer-vision-based method of claim 10, wherein the method further comprises the computer system
performing a comparison, for each of the target portions, of the pixel location of the target portion in each of the images with the pixel locations of said target portion in the next of said images in the series of images and deriving from said comparison a series of velocity data values as a number of pixels in the associated image; and
converting the velocity data to real-world measurement units using calibration data stored by the computer for each of the cameras defining a scaling of the pixels thereof to real-world measurements of movement of the respective target portion; and
calculating a derivative of said velocity data so as to derive therefrom acceleration data corresponding to acceleration of the target portion in real-world measurements; and
wherein the determining of the safety and/or serviceability assessment for said structure includes comparison for each of the target portions of the acceleration indicated by the acceleration data with a predetermined acceleration limit, and determination of a structural problem responsive to the comparison indicating one or more of the accelerations being greater than the predetermined acceleration limit.

12. The computer-vision-based method of claim 10, wherein the computer has data indicative of the estimated displacement distribution of the target portions subject to loading of the structure during the period of taking of the images of the target portions.

13. The computer-vision-based method of claim 12, wherein the structure is a bridge, and the method includes
receiving image data from a further camera positioned corresponding to video of a portion of the bridge on which vehicles travel, and
wherein the estimated displacement distribution is selected based on a detected position of a vehicle or positions of vehicles on the structure.

14. A computer-vision-based method for determining load worthiness, safety or serviceability of a structure, said method comprising:
directing one or more cameras at the structure so as to derive therefrom image data defining a series of images of a target portion of the structure;
receiving the image data at a computer system;
applying a computer vision process performed by said computer system to said image data so as to derive location data from the image data, said location data corresponding to locations of the target portion in each of said images;
determining a safety and/or serviceability assessment for said structure from said location data; and
outputting a report of the safety and/or serviceability assessment;
wherein the structure is a bridge having a plurality of longitudinally extending, laterally spaced girders, said target portion being at a longitudinal distance along one of the girders; and
said camera or another camera or cameras providing image data defining a series of images of other target portions of the structure that are each located on a respective one of the other girders at the same longitudinal distance therealong such that the target portions are generally aligned laterally; and
said applying of the computer vision process performed by said computer system derives location data for the other target portions from the image data corresponding to locations of the target portion in each of said images, said location data being indicative of a deflection of the respective girder;
wherein data is derived for the structure that estimates permissible deflection limits for each of the girders using a model of lateral load distribution in the bridge, and
the safety and/or serviceability assessment includes a notification of a problem with the structure responsive to a determination that the location data indicates that one or more of the one of the girders experienced a deflection that is greater than the respective deflection limit estimated therefor.

15. A computer-vision-based method for determining load worthiness or serviceability of a structure, said method comprising:
directing one or more cameras at the structure so as to derive therefrom image data defining a series of images of a target portion of the structure;
receiving the image data at a computer system;
applying a computer vision process performed by said computer system to said image data so as to derive location data from the image data, said location data corresponding to locations of the target portion in each of said images;
determining a safety and/or serviceability assessment for said structure from said location data; and
outputting a report of the safety and/or serviceability assessment;

wherein the structure is a bridge having a plurality of longitudinally extending, laterally spaced girders, said target portion being at a longitudinal distance along one of the girders, and said camera or another camera or cameras providing image data defining a series of images of other target portions of the structure that are each located on a respective one of the other girders at the same longitudinal distance therealong such that the target portions are generally aligned laterally; and said applying of the computer vision process performed by said computer system derives location data for the other target portions from the image data corresponding to locations of the target portion in each of said images, said location data being indicative of a deflection of the respective girder;

wherein a further camera is provided that video images from above the bridge that include images of vehicles passing over the bridge, and said images are transmitted to the computer system, wherein the computer system determines using computer vision presence of a vehicle on the bridge and a lateral lane location of the vehicle, and the lateral lane location is used to determine the permissible deflection limits for each of the girders when said vehicle is on the bridge.

16. The computer-vision-based method of claim 15, wherein the method further comprises synchronizing the images from all of the cameras the computer system is able to determine locations of the target portions at the same point in time, and using data indicative of the presence and lateral lane location of the vehicle at said point in time.

17. A computer-vision-based system for determining load worthiness or serviceability of a structure, said system comprising a plurality of cameras each directed at a respective target portion of the structure that moves as the structure experiences loads; and a computer system having computer accessible data storage associated therewith;

the cameras each communicating with said computer system so as to transmit to the computer system image data corresponding to a respective series of images taken spaced at equal time intervals of the respective target portion, said images each being a field of pixels;

the computer system having stored computer-vision software running on which the computer system processes the image data and identifies based thereon a pixel location of each of the target portions in each of the images;

the computer vision software causing the computer system to process the image data with a feature-extraction process in which pixel locations for the target portions are derived from key points in the images;

the computer system performing a comparison, for each of the target portions, of the pixel location of the target portion in a first of the images with the pixel locations of said target portion in the images later in the series of images and deriving from said comparison one or more displacement data values as a number of pixels in the associated image;

the computer having data indicative of an estimated displacement distribution of the target portions of the structure subject to loading thereof during the period of taking of the images of the target portions; and an additional camera supported so as to capture serial images of loads moving on said structure and transmitting said images to the computer system;

the computer system receiving said images from the additional camera and using a computer vision process to derive therefrom location of a load or loads on the structure, the data indicative of an estimated displacement distribution being modified or selected based on the location or locations of any load or load derived;

the computer system generating assessment data for the structure based on a comparison of the displacement data for the target portions with the estimated displacement distribution, said assessment data indicating a problem with the structure where any of the displacement data indicates that one or more of the target portions have deviated from the estimated displacement distribution by more than a predetermined threshold difference; and an output device with which the computer system communicates, said computer system transmitting the assessment data to said output device so as to be displayed to a user.

18. The system according to claim 17, wherein the system further comprises a synchronizer unit connected with all of the cameras, said synchronizer synchronizing all of the cameras so that the displacements of the target portions are linked time-wise to presence of a load or loads on the structure.

19. The system according to claim 17, wherein the structure is a bridge, and the loads are vehicles traveling on the bridge, and the target portions are each on a respective longitudinal girder of the bridge, wherein all of the target portions are located at a common longitudinal distance along the girders.

20. The system according to claim 17, where the structure is a vertically extending building and the displacements are lateral.

* * * * *